(12) United States Patent
Sasse et al.

(10) Patent No.: US 11,046,851 B2
(45) Date of Patent: Jun. 29, 2021

(54) ELECTRICAL CABLE HAVING CROSSLINKED INSULATION WITH INTERNAL PULLING LUBRICANT

(71) Applicant: Southwire Company, LLC, Carrollton, GA (US)

(72) Inventors: Philip Sasse, Douglasville, GA (US); Tim Andrea, Douglasville, GA (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 16/009,752

(22) Filed: Jun. 15, 2018

(65) Prior Publication Data

US 2018/0291205 A1 Oct. 11, 2018

Related U.S. Application Data

(63) Continuation of application No. 14/666,105, filed on Mar. 23, 2015, now Pat. No. 10,023,740, which is a
(Continued)

(51) Int. Cl.
*H01B 3/30* (2006.01)
*C08L 83/00* (2006.01)
(Continued)

(52) U.S. Cl.
CPC ............. *C08L 83/00* (2013.01); *C08L 23/04* (2013.01); *C08L 23/06* (2013.01); *C08L 51/06* (2013.01);
(Continued)

(58) Field of Classification Search
CPC .................................. H01B 3/30; H01B 3/44
(Continued)

(56) References Cited

U.S. PATENT DOCUMENTS 2,276,437 A  3/1942 Vaala
2,685,707 A  8/1954 Llewellyn et al.
(Continued)

FOREIGN PATENT DOCUMENTS

AU  2006335277 A1  1/2008
BR  PI 0609987 A2  11/2010
(Continued)

OTHER PUBLICATIONS

Cerro Wire Inc., Requestor Comments in Response to Examiner's Determination after Board Decision for Control No. 95/000,695, dated Dec. 13, 2018, 18 pages, USA.
(Continued)

*Primary Examiner* — Chau N Nguyen
(74) *Attorney, Agent, or Firm* — Alston & Bird LLP

(57) ABSTRACT

Electrical power cable having a reduced surface coefficient of friction and required installation pulling force, and the method of manufacture thereof, in which the central conductor core, with or without a separate insulating layer, is surrounded by a sheath of crosslinked polyethylene. A high viscosity, high molecular weight silicone based pulling lubricant or fatty acid amide pulling lubricant is incorporated by alternate methods with the polyethylene to form a composition from which the outer sheath is extruded, and is effective to reduce the required pulling force on the cable during installation.

14 Claims, 7 Drawing Sheets

Related U.S. Application Data continuation of application No. 12/406,454, filed on Mar. 18, 2009, now Pat. No. 8,986,586.

(51) Int. Cl.

| | | |
|---|---|---|
| *C08L 51/06* | (2006.01) | |
| *H01B 3/44* | (2006.01) | |
| *C08L 23/04* | (2006.01) | |
| *C08L 23/06* | (2006.01) | |
| *H01B 13/14* | (2006.01) | |

(52) U.S. Cl.
CPC ............. *H01B 3/308* (2013.01); *H01B 3/441* (2013.01); *H01B 13/14* (2013.01); *C08L 2203/202* (2013.01); *C08L 2312/00* (2013.01); *Y10T 428/1397* (2015.01)

(58) Field of Classification Search
USPC ...................................................... 174/110 R
See application file for complete search history.

(56) References Cited

U.S. PATENT DOCUMENTS

| | | |
|---|---|---|
| 2,717,515 A | 9/1955 | Pesante |
| 2,851,515 A | 9/1958 | Kolmorgen et al. |
| 2,930,838 A | 3/1960 | Chizallet et al. |
| 3,064,073 A | 11/1962 | Downing et al. |
| 3,106,981 A | 10/1963 | Chakiris |
| 3,108,981 A | 10/1963 | Clark et al. |
| 3,191,005 A | 6/1965 | Cox, II |
| 3,258,031 A | 6/1966 | French |
| 3,333,037 A | 7/1967 | Humphrey et al. |
| 3,378,628 A | 4/1968 | Garner |
| 3,433,884 A | 3/1969 | Cogelia et al. |
| 3,668,175 A | 6/1972 | Sattler |
| 3,686,436 A | 8/1972 | Camras |
| 3,747,428 A | 7/1973 | Waner et al. |
| 3,849,221 A | 11/1974 | Middleton |
| 3,852,875 A | 12/1974 | McAmis et al. |
| 3,858,687 A | 1/1975 | Masarky et al. |
| 3,868,436 A | 2/1975 | Ootsuji et al. |
| 3,877,142 A | 4/1975 | Hamano et al. |
| 3,885,286 A | 5/1975 | Hill |
| 3,925,216 A | 12/1975 | Moorhouse |
| 3,936,572 A | 2/1976 | MacKenzie, Jr. et al. |
| 4,002,797 A | 1/1977 | Hacker et al. |
| 4,043,851 A | 8/1977 | Holladay et al. |
| 4,057,956 A | 11/1977 | Tolle |
| 4,099,425 A | 7/1978 | Moore |
| 4,100,245 A | 7/1978 | Horikawa et al. |
| 4,137,623 A | 2/1979 | Taylor |
| 4,273,806 A | 6/1981 | Stechler |
| 4,274,509 A | 6/1981 | Thomson et al. |
| 4,275,096 A | 6/1981 | Taylor |
| 4,299,256 A | 11/1981 | Bacehowski et al. |
| 4,313,645 A | 2/1982 | Cocco |
| 4,356,139 A | 10/1982 | Rowland et al. |
| 4,360,492 A | 11/1982 | Rowland et al. |
| 4,401,361 A | 8/1983 | Slaughter |
| 4,416,380 A | 11/1983 | Flum |
| 4,454,949 A | 6/1984 | Flum |
| 4,522,733 A | 6/1985 | Jonnes |
| 4,547,246 A | 10/1985 | Viriyayuthakorn et al. |
| 4,549,041 A * | 10/1985 | Shingo ..................... C08K 3/22 174/113 R |
| 4,568,420 A | 2/1986 | Nonni |
| 4,569,420 A | 2/1986 | Pickett et al. |
| 4,605,818 A | 8/1986 | Arroyo et al. |
| 4,673,516 A | 6/1987 | Berry |
| 4,684,214 A | 8/1987 | Goldmann et al. |
| 4,693,936 A | 9/1987 | McGregor et al. |
| 4,749,059 A | 6/1988 | Jonnes et al. |
| 4,751,261 A | 6/1988 | Miyata et al. |
| 4,761,445 A | 8/1988 | Chiba |
| 4,770,902 A | 9/1988 | Barlow et al. |
| 4,773,954 A | 9/1988 | Starnes |
| 4,806,425 A | 2/1989 | Chu-Ba |
| 4,868,054 A | 9/1989 | Kartheiser |
| 4,877,815 A | 10/1989 | Buckmaster et al. |
| 4,895,221 A | 1/1990 | Carlson |
| 4,910,359 A | 3/1990 | Dougherty et al. |
| 4,937,142 A | 6/1990 | Ogushi et al. |
| 4,940,504 A | 7/1990 | Starnes, Jr. |
| 4,952,021 A | 8/1990 | Aoki et al. |
| 4,965,249 A | 10/1990 | De With et al. |
| 5,036,121 A | 7/1991 | Coaker et al. |
| 5,055,522 A | 10/1991 | Ikeda et al. |
| 5,074,640 A | 12/1991 | Hardin et al. |
| 5,156,715 A | 10/1992 | Starnes, Jr. |
| 5,225,635 A | 7/1993 | Wake et al. |
| 5,227,080 A | 7/1993 | Berry |
| 5,252,676 A | 10/1993 | Suyama et al. |
| 5,324,588 A | 6/1994 | Rinehart et al. |
| 5,326,638 A | 7/1994 | Mottine, Jr. et al. |
| 5,346,383 A | 9/1994 | Starnes, Jr. |
| 5,356,710 A | 10/1994 | Rinehart |
| 5,383,799 A | 1/1995 | Fladung |
| 5,422,385 A | 6/1995 | Farkas |
| 5,457,288 A | 10/1995 | Olsson |
| 5,460,885 A | 10/1995 | Chu-Ba |
| 5,492,760 A | 2/1996 | Sarma et al. |
| 5,505,900 A | 4/1996 | Suwanda et al. |
| 5,523,354 A | 6/1996 | Kaufmann et al. |
| 5,561,730 A | 10/1996 | Lochkovic et al. |
| 5,565,242 A | 10/1996 | Buttrick, Jr. et al. |
| 5,614,288 A | 3/1997 | Bustos |
| 5,614,482 A | 3/1997 | Baker et al. |
| 5,656,371 A | 8/1997 | Kawahigashi et al. |
| 5,660,932 A | 8/1997 | Durston et al. |
| 5,708,084 A | 1/1998 | Hauerstein et al. |
| 5,733,823 A | 3/1998 | Sugioka et al. |
| 5,741,858 A | 4/1998 | Brann et al. |
| 5,753,861 A | 5/1998 | Hansen et al. |
| 5,852,116 A | 12/1998 | Cree et al. |
| 5,856,405 A | 1/1999 | Hofmann |
| 5,886,072 A | 3/1999 | Linsky et al. |
| 5,912,436 A | 6/1999 | Sanchez et al. |
| 5,925,601 A | 7/1999 | McSherry et al. |
| 6,019,628 A | 2/2000 | Shinchi |
| 6,057,018 A | 5/2000 | Schmidt |
| 6,064,073 A | 5/2000 | Hoogenraad et al. |
| 6,080,489 A | 6/2000 | Mehta |
| 6,114,036 A | 9/2000 | Rinehart et al. |
| 6,137,058 A | 10/2000 | Moe et al. |
| 6,146,699 A | 11/2000 | Bonicel et al. |
| 6,159,617 A | 12/2000 | Foster et al. |
| 6,160,940 A | 12/2000 | Summers et al. |
| 6,179,665 B1 | 1/2001 | Rossman et al. |
| 6,188,026 B1 | 2/2001 | Cope et al. |
| 6,228,495 B1 | 5/2001 | Lupia et al. |
| 6,270,849 B1 | 8/2001 | Popoola et al. |
| 6,281,431 B1 | 8/2001 | Cumley |
| 6,327,841 B1 | 12/2001 | Bertini et al. |
| 6,347,561 B2 | 2/2002 | Uneme et al. |
| 6,392,155 B1 | 5/2002 | Shimizu et al. |
| 6,395,989 B2 | 5/2002 | Lecoeuvre et al. |
| 6,416,813 B1 | 7/2002 | Valls Prats et al. |
| 6,418,704 B2 | 7/2002 | Bertini et al. |
| 6,461,730 B1 | 10/2002 | Bachmann et al. |
| 6,474,057 B2 | 11/2002 | Bertini et al. |
| 6,485,325 B1 | 11/2002 | Fukuda |
| 6,534,717 B2 | 3/2003 | Suzuki et al. |
| 6,565,242 B2 | 5/2003 | Dai et al. |
| 6,640,533 B2 | 11/2003 | Bertini et al. |
| 6,646,205 B2 | 11/2003 | Hase et al. |
| 6,810,188 B1 | 10/2004 | Suzuki et al. |
| 6,850,681 B2 | 2/2005 | Lepont et al. |
| 6,852,412 B2 | 2/2005 | Keogh |
| 6,864,420 B2 | 3/2005 | Li |
| 6,897,382 B2 | 5/2005 | Hager et al. |
| 6,903,264 B2 | 6/2005 | Watanabe et al. |
| 6,906,258 B2 | 6/2005 | Hirai et al. |

(56) References Cited

U.S. PATENT DOCUMENTS

| | | | |
|---|---|---|---|
| 6,924,031 B2 * | 8/2005 | Grizante Redondo | C08L 23/04 174/110 A |
| 6,977,280 B2 | 12/2005 | Lee et al. | |
| 7,053,308 B2 | 5/2006 | Prats et al. | |
| 7,136,556 B2 | 11/2006 | Brown et al. | |
| 7,144,952 B1 | 12/2006 | Court et al. | |
| 7,411,129 B2 | 8/2008 | Kummer et al. | |
| 7,447,406 B2 | 11/2008 | Sutehall et al. | |
| 7,557,301 B2 | 7/2009 | Kummer et al. | |
| 7,749,024 B2 | 7/2010 | Chambers et al. | |
| 8,043,119 B2 | 10/2011 | Kummer et al. | |
| 8,124,875 B2 | 2/2012 | Aitken et al. | |
| 8,378,009 B2 * | 2/2013 | Inagaki | C08F 255/00 523/351 |
| 8,382,518 B2 | 2/2013 | Chambers et al. | |
| 8,616,918 B2 | 12/2013 | Chambers et al. | |
| 8,658,576 B1 | 2/2014 | Bigbee, Jr. et al. | |
| 8,701,277 B2 | 4/2014 | Kummer et al. | |
| 8,800,967 B2 | 8/2014 | Carlson et al. | |
| 8,844,905 B2 | 9/2014 | Carlson et al. | |
| 8,883,917 B1 | 11/2014 | Davie et al. | |
| 8,912,253 B2 | 12/2014 | Montes et al. | |
| 8,986,586 B2 | 3/2015 | Sasse et al. | |
| 9,352,371 B1 | 5/2016 | Bigbee et al. | |
| 7,749,024 C1 | 7/2016 | Chambers et al. | |
| 9,412,495 B1 | 8/2016 | Bennett et al. | |
| 9,431,152 B2 | 8/2016 | Sasse et al. | |
| 9,587,201 B2 | 3/2017 | Tomsheck et al. | |
| 7,411,129 C1 | 9/2017 | Kummer et al. | |
| 9,922,756 B1 | 3/2018 | Smith et al. | |
| 2002/0002221 A1 | 1/2002 | Lee | |
| 2002/0010252 A1 | 1/2002 | Lecoeuvre et al. | |
| 2002/0043391 A1 | 4/2002 | Suzuki et al. | |
| 2002/0129966 A1 * | 9/2002 | Schneider | G02B 6/4438 174/112 |
| 2003/0098176 A1 | 5/2003 | Mesaki et al. | |
| 2003/0161596 A1 | 8/2003 | Register, III et al. | |
| 2003/0195279 A1 | 10/2003 | Shah et al. | |
| 2003/0234472 A1 * | 12/2003 | Bolcar | B29C 37/0028 264/328.1 |
| 2004/0001682 A1 | 1/2004 | Beuth et al. | |
| 2004/0007308 A1 | 1/2004 | Houston et al. | |
| 2004/0198909 A1 | 10/2004 | Breitscheidel et al. | |
| 2004/0254299 A1 | 12/2004 | Lee et al. | |
| 2005/0019353 A1 | 1/2005 | Prinz et al. | |
| 2005/0023029 A1 | 2/2005 | Mammeri et al. | |
| 2005/0036753 A1 | 2/2005 | Will et al. | |
| 2005/0180725 A1 | 8/2005 | Carlson et al. | |
| 2006/0032661 A1 | 2/2006 | Gai | |
| 2006/0065428 A1 | 3/2006 | Kummer et al. | |
| 2006/0065430 A1 | 3/2006 | Kummer | |
| 2006/0068085 A1 | 3/2006 | Reece et al. | |
| 2006/0068086 A1 | 3/2006 | Reece et al. | |
| 2006/0088657 A1 | 4/2006 | Reece et al. | |
| 2006/0151196 A1 | 7/2006 | Kummer et al. | |
| 2006/0157303 A1 | 7/2006 | Reece et al. | |
| 2006/0191621 A1 | 8/2006 | Kummer et al. | |
| 2006/0249298 A1 | 11/2006 | Reece et al. | |
| 2006/0249299 A1 | 11/2006 | Kummer et al. | |
| 2006/0251802 A1 | 11/2006 | Kummer et al. | |
| 2007/0098340 A1 | 5/2007 | Lee et al. | |
| 2007/0243761 A1 | 10/2007 | Chambers et al. | |
| 2008/0066946 A1 | 3/2008 | Kummer et al. | |
| 2008/0257599 A1 | 10/2008 | Matsushita et al. | |
| 2008/0317990 A1 | 12/2008 | Runyan et al. | |
| 2009/0233052 A1 | 9/2009 | Thuot et al. | |
| 2010/0230134 A1 | 9/2010 | Chambers et al. | |
| 2010/0236045 A1 | 9/2010 | Galindo et al. | |
| 2010/0236811 A1 | 9/2010 | Sasse et al. | |
| 2010/0307822 A1 * | 12/2010 | Schmidt | H01B 7/295 174/74 R |
| 2010/0326695 A1 | 12/2010 | Dion et al. | |
| 2013/0153261 A1 | 6/2013 | Bremser et al. | |
| 2013/0218325 A1 | 8/2013 | Carlson et al. | |
| 2014/0053389 A1 | 2/2014 | Galindo et al. | |
| 2014/0113069 A1 | 4/2014 | Kummer et al. | |
| 2015/0014468 A1 | 1/2015 | Carlson et al. | |
| 2015/0034891 A1 | 2/2015 | Carlson et al. | |
| 2016/0012945 A1 | 1/2016 | Sasse et al. | |

FOREIGN PATENT DOCUMENTS

| | | |
|---|---|---|
| CA | 2614485 A1 | 2/2006 |
| CA | 2726607 A1 | 12/2009 |
| CA | 2755343 A1 | 9/2010 |
| CA | 2774428 A1 | 4/2011 |
| CN | 101223609 A | 7/2008 |
| CN | 202917210 U | 5/2013 |
| DE | 2528307 A1 | 1/1977 |
| DE | 4410456 A1 | 9/1995 |
| DO | P 2011000290 A | 2/2012 |
| EA | 016504 B1 | 5/2012 |
| EG | 25128 A | 9/2011 |
| EP | 283132 A2 | 9/1988 |
| EP | 364717 A1 | 4/1990 |
| EP | 544411 A1 | 6/1993 |
| EP | 1524294 A1 | 4/2005 |
| EP | 1899987 A1 | 3/2008 |
| EP | 1899988 A2 | 3/2008 |
| ES | 2402777 T3 | 5/2013 |
| FR | 2674364 A1 | 9/1992 |
| HK | 1113611 A1 | 5/2013 |
| IN | 9500996 I4 | 3/2010 |
| JP | 59-159708 A | 9/1984 |
| JP | 61-076409 A | 4/1986 |
| JP | 61-76409 U | 5/1986 |
| JP | S61-133506 A | 6/1986 |
| JP | S61-133507 A | 6/1986 |
| JP | 63-094503 U | 6/1988 |
| JP | 63-216220 A | 9/1988 |
| JP | 1-110013 A | 4/1989 |
| JP | 1-144504 A | 6/1989 |
| JP | 1-166410 A | 6/1989 |
| JP | 1-307110 A | 12/1989 |
| JP | 5-266720 A | 10/1993 |
| JP | 6-057145 A | 3/1994 |
| JP | 7-134913 A | 5/1995 |
| JP | 08-222041 A | 8/1996 |
| JP | 9-045143 A | 2/1997 |
| JP | 9-180558 A | 7/1997 |
| JP | 9-251811 A | 9/1997 |
| JP | 10-012051 A | 1/1998 |
| JP | 10-086207 A | 4/1998 |
| JP | 2000-120922 A | 4/2000 |
| JP | 2001-026401 A | 1/2001 |
| JP | 2001-031903 A | 2/2001 |
| JP | 2001-052536 A | 2/2001 |
| JP | 2001-256836 A | 9/2001 |
| JP | 2001-264601 A | 9/2001 |
| JP | 2002-128963 A | 5/2002 |
| JP | 2002-231065 A | 8/2002 |
| JP | 2002-313153 A | 10/2002 |
| JP | 2002-324438 A | 11/2002 |
| JP | 2003-323820 A | 11/2003 |
| JP | 2009-503765 A | 1/2009 |
| JP | 2013-251270 A | 12/2013 |
| KR | 2008041151 A | 5/2008 |
| KR | 2013056283 A | 5/2013 |
| MX | 2007014798 A | 5/2008 |
| MX | 2011010044 A | 1/2012 |
| NZ | 564551 A | 3/2011 |
| SG | 161929 A1 | 6/2010 |
| WO | WO 1989/000763 A1 | 1/1989 |
| WO | WO 1991/008262 A2 | 6/1991 |
| WO | WO 2000/040653 A1 | 7/2000 |
| WO | WO 2001/081969 A1 | 11/2001 |
| WO | WO 2001/090230 A1 | 11/2001 |
| WO | WO 2005/042226 A1 | 5/2005 |
| WO | WO 2006/016895 A1 | 2/2006 |
| WO | WO 2006/016896 A1 | 2/2006 |
| WO | WO 2006/118702 A2 | 11/2006 |
| WO | WO 2006/127711 A2 | 11/2006 |

(56) References Cited

FOREIGN PATENT DOCUMENTS

| WO | WO 2006/135467 A1 | 12/2006 |
|----|-------------------|---------|
| WO | WO 2007/081372 A1 | 7/2007 |
| WO | WO 2007/084745 A2 | 7/2007 |
| WO | WO-2008/146921 * | 12/2008 |
| WO | WO 2010/111167 A1 | 9/2010 |
| WO | WO 2011/046998 A1 | 4/2011 |
| ZA | 200711170 A | 8/2009 |

OTHER PUBLICATIONS

Southwire Company, Patent Owner's Comments in Response to Examiner's Determination after Board Decision for Control No. 95/000,695, dated Dec. 14, 2018, 26 pages, USA.

Southwire Company, Response to Jun. 14, 2018 Non-Final Office Action, including Affidavits, for U.S. Appl. No. 14/858,872, dated Nov. 14, 2018, 41 pages, USA.

United States Patent and Trademark Office, Examiner's Determination after Board Decision for Control No. 95/000,695, dated Nov. 14, 2018, 23 pages, USA.

United States Patent and Trademark Office, Letter Restarting Period for Response for U.S. Appl. No. 16/015,688, dated Nov. 5, 2018, 15 pages, U.S.A.

United States Patent and Trademark Office, Office Action for U.S. Appl. No. 16/015,716, dated Nov. 16, 2018, 70 pages, USA.

United States Patent and Trademark Office, Applicant Initiated Interview Summary for U.S. Appl. No. 14/858,872, dated Oct. 2, 2018, 5 pages, U.S.A.

United States Patent and Trademark Office, Examiner's Determination on Patent Owner's Response for Control No. 95/000,695, dated Oct. 11, 2018, 23 pages, U.S.A.

United States Patent and Trademark Office, Office Action for U.S. Appl. No. 15/590,881, dated Sep. 5, 2018, 61 pages, U.S.A.

United States Patent and Trademark Office, Office Action for U.S. Appl. No. 16/015,688, dated Sep. 20, 2018, 65 pages, U.S.A.

American Polywater Corporation, "www.polywater.com/3000tech. html", Copyright 2001-2015, Jan. 6, 2009 to Jul. 27, 2015 Internet Archive <http://web.archive.org/web/*/http://www.polywater.com/3000tech.html>, 4 page.

American Polywater Corporation, "www.polywater.com/techtak1. html" Copyright 2001-2015, Dec. 21, 1997 to Jul. 29, 2015 Internet Archive <http://web.archive.org/web/*/http://www.polywater.com/techtak1.html>, 5 pages.

Axel Plastics Research Laboratories, Inc., Product Data Sheet re "Mold Wiz, INT-40DHT" (Approx. 2001) (1p).

Axel Plastics Research Laboratories, Inc., Product Data Sheet re "Mold Wiz, INT-40GHT" (Approx. 2001) (1p).

Axel Plastics Research Laboratories, Inc., Product Data Sheet re "Mold Wiz, INT-33PA" (Approx. 2000) (1p).

Cerro Wire Inc., Appeal Brief in Inter Partes Reexamination of U.S. Pat. No. 8,043,119 (U.S. Appl. No. 95/000,695, filed Dec. 10, 2014), 135 pages, U.S.

Cerro Wire Inc., Appeal Brief in Inter Partes Reexamination of U.S. Pat. No. 7,557,301 (U.S. Appl. No. 95/000,696, filed Jun. 3, 2014), 76 pages, U.S.

Cerro Wire Inc., Corrected Respondent Brief in Inter Partes Reexamination of U.S. Pat. No. 7,411,129 (U.S. Appl. No. 95/000,403, filed Dec. 10, 2010), 16 pages, U.S.

Cerro Wire Inc., Notice of Cross Appeal in Inter Partes Reexamination of U.S. Pat. No. 7,557,301 (U.S. Appl. No. 95/000,696, filed Apr. 4, 2014), 1 pages, U.S.

Cerro Wire Inc., Notice of Cross-Appeal to U.S. Court of Appeals for the Federal Circuit in Inter Partes Reexamination of U.S Pat. No. 7,749,024 (U.S. Appl. No. 95/000,594, filed Sep. 29, 2014), 4 pages, U.S.

Cerro Wire Inc., Rebuttal Brief in Inter Partes Reexamination of U.S. Pat. No. 7,411,129 (U.S. Appl. No. 95/000,403, filed Oct. 22, 2012), 18 pages, U.S.

Cerro Wire Inc., Rebuttal Brief in Inter Partes Reexamination of U.S. Pat. No. 7,749,024 (U.S. Appl. No. 95/000,594, filed Jan. 6, 2014), 18 pages, U.S.

Cerro Wire Inc., Rebuttal Brief in Inter Partes Reexamination of U.S. Pat. No. 8,043,119 (U.S. Appl. No. 95/000,695, filed Mar. 4, 2015), 18 pages, U.S.

Cerro Wire Inc., Rebuttal Brief on Appeal by Appellant Requestor in Inter Partes Reexamination of U.S. Pat. No. 7,557,301 (U.S. Appl. No. 95/000,696, filed Sep. 29, 2014), 14 pages, U.S.

Cerro Wire Inc., Request for Ex Parte Examination of U.S. Pat. No. 7,557,301 (U.S. Appl. No. 90/009,589, filed Oct. 1, 2009), 380 pages, U.S.

Cerro Wire Inc., Request for Inter Partes Reexamination of U.S. Pat. No. 7,411,129 (U.S. Appl. No. 95/000,403, filed Sep. 26, 2008), 112 pages, U.S.

Cerro Wire Inc., Request for Inter Partes Reexamination of U.S. Pat. No. 7,749,024 (U.S. Appl. No. 95/000,594, filed Nov. 17, 2010), 63 pages, U.S.

Cerro Wire Inc., Request for Inter Partes Reexamination of U.S. Pat. No. 8,043,119 (U.S. Appl. No. 95/000,695, filed Sep. 14, 2012), 95 pages, U.S.

Cerro Wire Inc., Request for Rehearing in Inter Partes Reexamination of U.S. Pat. No. 8,043,119 (U.S. Appl. No. 95/000,695, filed Feb. 16, 2018), 15 pages, U.S.A.

Cerro Wire Inc., Requester Comments on Patent Owner Response after Board Decision, including Exhibits, in Inter Partes Reexamination of U.S. Pat. No. 8,043,119 (U.S. Appl. No. 95/000,695, filed Mar. 15, 2018), 122 pages, U.S.A.

Cerro Wire Inc., Respondent Brief by Third Party Requestor in Inter Partes Reexamination of U.S. Pat. No. 7,557,301 (U.S. Appl. No. 95/000,696, filed Jul. 30, 2014), 95 pages, U.S.

Cerro Wire Inc., Respondent Brief in Inter Partes Reexamination of U.S. Pat. No. 7,411,129 (U.S. Appl. No. 95/000,403, filed Oct. 13, 2010), 30 pages, U.S.

Cerro Wire Inc., Respondent Brief in Inter Partes Reexamination of U.S. Pat. No. 8,043,119 (U.S. Appl. No. 95/000,695, filed Jan. 12, 2015), 136 pages, U.S.

Cerro Wire Inc., Response in Inter Partes Reexamination of U.S. Pat. No. 7,411,129 (U.S. Appl. No. 95/000,403, filed Mar. 4, 2009), 44 pages, U.S.

Cerro Wire Inc., Response in Inter Partes Reexamination of U.S. Pat. No. 7,411,129 (U.S. Appl. No. 95/000,403, filed Sep. 30, 2009), 38 pages, U.S.

Cerro Wire Inc., Response in Inter Partes Reexamination of U.S. Pat. No. 7,411,129 (U.S. Appl. No. 95/000,403, filed May 14, 2010), 7 pages, U.S.

Cerro Wire Inc., Response in Inter Partes Reexamination of U.S. Pat. No. 7,411,129 (U.S. Appl. No. 95/000,403, filed Jun. 1, 2010), 9 pages, U.S.

Cerro Wire Inc., Response in Inter Partes Reexamination of U.S. Pat. No. 7,411,129 (U.S. Appl. No. 95/000,403, filed Jul. 14, 2010), 32 pages, U.S.

Cerro Wire Inc., Response in Inter Partes Reexamination of U.S. Pat. No. 7,411,129 (U.S. Appl. No. 95/000,403, filed Sep. 30, 2010), 12 pages, U.S.

Cerro Wire Inc., Response in Inter Partes Reexamination of U.S. Pat. No. 7,411,129 (U.S. Appl. No. 95/000,403, filed Mar. 2, 2015), 18 pages, U.S.

Cerro Wire Inc., Response in Inter Partes Reexamination of U.S. Pat. No. 7,749,024 (U.S. Appl. No. 95/000,594, filed May 11, 2011), 69 pages, U.S.

Cerro Wire Inc., Response in Inter Partes Reexamination of U.S. Pat. No. 8,043,119 (U.S. Appl. No. 95/000,695, filed Jun. 17, 2013), 89 pages, U.S.

Cerro Wire Inc., Response in Inter Partes Reexamination of U.S. Pat. No. 8,043,119 (U.S. Appl. No. 95/000,695, filed May 14, 2014), 211 pages, U.S.

Cerro Wire Inc., Response in Inter Partes Reexamination of U.S. Pat. No. 8,043,119 (U.S. Appl. No. 95/000,695, filed Oct. 10, 2014), 7 pages, U.S.

Cerro Wire Inc., Response in Inter Partes Reexamination of U.S. Pat. No. 7,557,301 (U.S. Appl. No. 95/000,696, filed Jan. 6, 2014), 40 pages, U.S.

(56) References Cited

OTHER PUBLICATIONS

Cerro Wire Inc., Response in Inter Partes Reexamination of U.S. Pat. No. 7,557,301 (U.S. Appl. No. 95/000,696, filed Jan. 24, 2014), 14 pages, U.S.
Cerro Wire Inc., Response to Decision on Appeal in Inter Partes Reexamination of U.S. Pat. No. 7,411,129 (U.S. Appl. No. 95/000,403, filed Mar. 28, 2014), 61 pages, U.S.
Cerro Wire LLC, Corrected Response Brief for Cross-Appellant in *Southwire Company, LLC* v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Mar. 2, 2015, 59 pages.
Cerro Wire LLC, Reply Brief for Cross-Appellant in *Southwire Company, LLC* v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, May 7, 2015, 25 pages.
Cerro Wire LLC., Request for Inter Partes Reexamination of U.S. Pat. No. 7,557,301 (U.S. Appl. No. 95/000,696, filed Sep. 14, 2012), 96 pages, U.S.
Cerro Wire LLC., Request for Oral Hearing for Inter Partes Reexamination of U.S. Pat. No. 7,557,301 (U.S. Appl. No. 95/000,696, filed Jun. 24, 2015), 10 pages, U.S.
Cerro Wire LLC., Requestor Comments in Opposition to Request for Rehearing in Inter Partes Reexamination of U.S. Pat. No. 7,557,301 (U.S. Appl. No. 95/000,696, filed Nov. 30, 2015), 10 pages, U.S.
Cerro Wire LLC., Response for Inter Partes Reexamination of U.S. Pat. No. 7,557,301 (U.S. Appl. No. 95/000,696, filed Mar. 13, 2013), 49 pages, U.S.
Cerro Wire, Inc., Corrected Response Brief for Appellee in *Southwire Company* v. *Cerro Wire, Inc*, U.S. Court of Appeals for the Federal Circuit Case No. 2016-2287 (relating to U.S. Pat. No. 7,557,301, Control/U.S. Appl. No. 95/000,696, filed Dec. 23, 2016), 71 pages.
Cerro Wire, Inc., Exhibit W-11-W-20 (Claim Charts), Request for Inter Partes Reexamination Under 35 U.S.C. M311-318 (Control No. 95/000,594); Nov. 17, 2010; pp. 1-1023 (US).
Cerro Wire, Inc., Exhibit W-1-W-10 (Claim Charts), Request for Inter Partes Reexamination Under 35 U.S.C. M311-318 (Control No. 95/000,594); Nov. 17, 2010; pp. 1-1023 (US).
Cerro Wire, Inc., Exhibit W-21-W-30 (Claim Charts), Request for Inter Partes Reexamination Under 35 U.S.C. M311-318 (Control No. 95/000,594); Nov. 17, 2010; pp. 1-1023 (US).
Cerro Wire, Inc., Exhibit W-31-W-38 (Claim Charts), Request for Inter Partes Reexamination Under 35 U.S.C. M311-318 (Control No. 95/000,594); Nov. 17, 2010; pp. 1-1023 (US).
Crompton Corporation brochure on Amides (approx. 2003) (27pp).
Crompton Corporation, Brochure entitled "Vinyl Additives Product Guide", (2002) (16pp).
Declaration of William N. Unertl, PhD, Reexamination 95/000,573, Exhibit 2, Feb. 25, 2011, 27 pages.
Decoste, J.B., "Friction of Vinyl Chloride Plastics", SPE Journal, Oct. 1969, pp. 67-71, vol. 25.
Domininghaus, H., "Les Matieres plastiques les plus usuelles," Informations Chimie No. 158, 1976, p. 179-195.
Dow Corning article "Siloxane additive minimizes friction in fibre optic cable conduit", 2001 (2pp) (http://www.dowcorning.com).
Dow Corning presentation entitled "MBs to Improve CoF—Injection Moulding & Extrusion"; from filed entitled "DC (multibase) Masterbatch training 2004.ppt"; date uncertain; 8 pages (US).
Dow Corning Product Information sheet re Dow Corning MB25-504 composition, Feb. 1, 2002 (4pp) (http://www.dowcorning.com).
Dow Corning Product Information sheet re Dow Corning MB40-006 composition, Apr. 11, 2005 (4pp) (http://www.dowcorning.com).
Dow Corning Product Information sheet re Dow Corning MB50-001 composition, Jan. 15, 2001 (6pp) (http://www.dowcorning.com).
Dow Corning Product Information sheet re Dow Corning MB50-002 composition, Jun. 2, 2014 (3pp) (http://www.dowcorning.com).
Dow Corning Product Information sheet re Dow Corning MB50-004 composition, Jan. 15, 2001 (4pp) (http://www.dowcorning.com).
Dow Corning Product Information sheet re Dow Corning MB50-008 composition, Apr. 11, 2005 (1 pp) (http://www.dowcorning.com).
Dow Corning Product Information sheet re Dow Corning MB50-010 composition, Jan. 16, 2001 (2pp) (http://www.dowcorning.com).
Dow Corning Product Information sheet re Dow Corning MB50-011 composition, Apr. 11, 2005 (4pp) (http://www.dowcorning.com).
Dow Corning Product Information sheet re Dow Corning MB50-320 composition, Mar. 4, 2008 (1p) (http://www.dowcorning.com).
Dow Corning Product Information sheet re Dow Corning MB50-321 composition, Jan. 15, 2001 (2pp) (http://www.dowcorning.com).
Dow Corning Product Information sheets re Dow Corning MB50-313 composition, Jan. 15, 2001 (2pp) (http://www.dowcorning.com).
Dow Corning Product Information sheets re Dow Corning MB50-314 composition, Jan. 15, 2001 (2pp) (http://www.dowcorning.com).
Dow Corning, Dow Corning MB50-011 Masterbatch Product Information, Ultra-high molecular weight siloxane polymer dispersed in nylon 6, 1999, 5 pages.
Dow Corning, Dow Corning MB50-011 Masterbatch Product Information, Ultra-high molecular weight siloxane polymer dispersed in polyamide 6, 1997-2001, 4 pages.
Ei Du Pont De Nemours and Company, Flyer entitled "Teflon", (Aug. 14, 2003) (1p) (http://www.dupont.com).
*Encore Wire Corporation* v. *Southwire Company, LLC*, Oral Arguments can be retrieved from <http://oralarguments.cafc.uscourts.gov/default.aspx?fl=2015-1249.mp3>, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Oct. 7, 2015.
Encore Wire Corporation, Corrected Joint Appendix in *Encore Wire Corporation* v. *Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jul. 28, 2015, 427 pages.
Encore Wire Corporation, Notice of Appeal to the U.S. Court of Appeals for the Federal Circuit in Inter Partes Reexamination of U.S. Pat. No. 7,749,024 (U.S. Appl. No. 95/000,573, filed Nov. 26, 2014), 9 pages, U.S.
Encore Wire Corporation, Opening Brief of Appellant in *Encore Wire Corporation* v. *Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Mar. 10, 2015, 84 pages.
Encore Wire Corporation, Replacement Request for Ex Parte Reexamination Statements for U.S. Pat. No. 7,557,301 (U.S. Appl. No. 90/009,592, filed Nov. 17, 2009), 50 pages, U.S.
Encore Wire Corporation, Replacement Request for Inter Partes Reexamination of U.S. Pat. No. 7,749,024 (U.S. Appl. No. 95/000,573, filed Oct. 8, 2010), 91 pages, U.S.
Encore Wire Corporation, Reply and Response Brief of Appellant/Cross-Appellee in *Encore Wire Corporation* v. *Southwire Company, LLC*, Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jun. 11, 2015, 41 pages.
Encore Wire Corporation, Request for Ex Parte Examination of U.S. Pat. No. 7,557,301 (U.S. Appl. No. 90/009,592, filed Oct. 7, 2009), 161 pages, U.S.

(56) References Cited

OTHER PUBLICATIONS

Encore Wire Corporation, Request for Inter Partes Reexamination of U.S. Pat. No. 7,749,024 (U.S. Appl. No. 95/000,573, filed Sep. 23, 2010), 92 pages, U.S.
Encore Wire Corporation, Request for Rehearing in Inter Partes Reexamination of U.S. Pat. No. 7,749,024 (U.S. Appl. No. 95/000,573, filed Apr. 22, 2014), 7 pages, U.S.
Encore Wire Corporation, Response Brief in Inter Partes Reexamination of U.S. Pat. No. 7,749,024 (U.S. Appl. No. 95/000,573, filed Jan. 25, 2013), 53 pages, U.S.
Encore Wire Corporation, Response in Inter Partes Reexamination of U.S. Pat. No. 7,749,024 (U.S. Appl. No. 95/000,573, filed Mar. 2, 2011), 51 pages, U.S.
Encore Wire, Inc., Exhibits 1-9 (Claim Charts) of Corrected Request for Inter Partes Reexamination Under 35 U.S.C. §§1.193 (Control No. 95/000,573); Oct. 8, 2010; pp. 1-137 (US).
European Patent Office, Extended European Search Report for Application No. 06739714.1, dated Nov. 12, 2009, 11 pages, The Netherlands.
European Patent Office, Extended European Search Report for Application No. 06770960.0, dated Aug. 21, 2008, 5 pages, The Netherlands.
European Patent Office, Minutes of Oral Proceeding for Application No. 06770960.0, Jun. 25, 2012, 5 pages, The Netherlands.
European Patent Office, Office Action for Application No. 06739714.1, dated Aug. 25, 2011, 5 pages, The Netherlands.
European Patent Office, Office Action for Application No. 06739714.1, dated Feb. 5, 2013, 9 pages, The Netherlands.
European Patent Office, Office Action for Application No. 06739714.1, dated Jun. 26, 2013, 5 pages, The Netherlands.
European Patent Office, Third Party Observations for Application No. 06739714.1, May 21, 2012, 237 pages, The Netherlands.
European Patent Office, Third Party Observations for Application No. 06770960.0, Apr. 19, 2012, 231 pages, The Netherlands.
Examination Report for New Zealand Application No. 564551, dated Aug. 14, 2009.
General Electric Company, Brochure entitled "GE Silicones-Fluids, Emulsions & Specialties", (2001) (19pp).
Howard & Howard letter to Mr. Thomas C. Wright dated Feb. 7, 2008 regarding U.S. Appl. No. 11/675,441 (2pp) (US).
International Preliminary Examining Authority, International Preliminary Report on Patentability for International Application No. PCT/US2005/005165, dated Jan. 16, 2007, 6 pages, the International Bureau of WIPO, Switzerland.
International Preliminary Examining Authority, International Preliminary Report on Patentability for International Application No. PCT/US2006/011069, dated Nov. 30, 2007, 7 pages, the International Bureau of WIPO, Switzerland.
International Preliminary Examining Authority, International Preliminary Report on Patentability for International Application No. PCT/US2006/019923, dated Nov. 30, 2007, 8 pages, the International Bureau of WIPO, Switzerland.
International Preliminary Examining Authority, International Preliminary Report on Patentability for International Application No. PCT/US2010/027684, dated Sep. 20, 2011, 8 pages, the International Bureau of WIPO, Switzerland.
International Preliminary Examining Authority, International Preliminary Report on Patentability for International Application No. PCT/US05/05251, dated Mar. 14, 2006, 4 pages, United States Patent and Trademark Office, U.S.A.
International Preliminary Examining Authority, International Preliminary Report on Patentability for International Application No. PCT/US2006/010929, dated Nov. 30, 2007, 4 pages, United States Patent and Trademark Office, U.S.A.
International Searching Authority, International Search Report and Written Opinion for International Application No. PCT/US05/05165, dated Dec. 20, 2005, 8 pages, United States Patent and Trademark Office, U.S.

International Searching Authority, International Search Report and Written Opinion for International Application No. PCT/US06/11069, dated Aug. 21, 2006, 8 pages, United States Patent and Trademark Office, U.S.
International Searching Authority, International Search Report and Written Opinion for International Application No. PCT/US06/19923, dated Oct. 20, 2006, 9 pages, United States Patent and Trademark Office, U.S.
International Searching Authority, International Search Report and Written Opinion for International Application No. PCT/US10/27684, dated May 17, 2010, 8 pages, United States Patent and Trademark Office, U.S.
International Searching Authority, International Search Report and Written Opinion for International Application No. PCT/US05/05251, dated Jul. 5, 2005, 4 pages, United States Patent and Trademark Office, U.S.A.
International Searching Authority, International Search Report and Written Opinion for International Application No. PCT/US06/11070, dated Dec. 27, 2006, 7 pages, United States Patent and Trademark Office, U.S.A.
International Searching Authority, International Search Report and Written Opinion for International Application No. PCT/US06/10929, dated Aug. 1, 2006, 4 pages, United States Patent and Trademark Office, U.S.A.
Kaufman, S., et al., "A PVC jacket compound with improved flame retardancy and superior physical properties", Wire Technology, pp. 44-50, 7/8:75, (paper presented at the 23rd international Wire & Cable Symposium in Atlantic City, Dec. 1974).
Marquis, et al., "An Introduction to Fatty Acid Amide Slip and Anti-Block Agents", Polymers, Laminations & Coatings Conference in San Francisco, CA. from Aug. 30 to Sep. 3, 1998, pp. 941-952, Tappi Press.
Office Action for Co-Pending Japanese Patent Application No. 2008-513468, dated Dec. 20, 2011, 5 pages. (Translation only).
Office Action for Co-Pending Japanese Patent Application No. 2013-150174, dated Jul. 22, 2014, 11 pages.
Office Action for Co-Pending Patent Application No. 88656 in Panama dated Oct. 6, 2011, 2 pgs.
Opposition to European Patent EP 1899988 and accompanying documentation, filed with EPO on Oct. 22, 2013, received Oct. 29, 2013, 23 pages.
Polywater® J specification, Lubrifiant Haute Performance, American Polywater Corporation, Aug. 2010, 4 pages.
Ryan, K. J., et al., "Ultra-High-Molecular-Weight Functional Siloxane Additives in Polymers. Effects on Processing and Properties," Vinyl & Additive Technology, Mar. 2000, vol. 6, No. , 13 pages.
Southwire Company and Cerro Wire LLC, (Joint) Stipulated Motion to Voluntarily Dismiss Appeal in *Southwire Company v. Cerro Wire LLC*, U.S. Court of Appeals for the Federal Circuit No. 2016-2643 (relating to U.S. Pat. No. 7,411,129, Control/U.S. Appl. No. 95/000,403, filed Jan. 26, 2017), 7 pages.
Southwire Company and Cerro Wire, Inc., Joint Appendix in *Southwire Company v. Cerro Wire, Inc.*, U.S. Court of Appeals for the Federal Circuit Case No. 2016-2287 (relating to U.S. Pat. No. 7,557,301, Control/U.S. Appl. No. 95/000,696, filed Feb. 17, 2017), 323 pages.
*Southwire Company v. Cerro Wire Inc.*, Answer to Complaint for Patent Infringement and Demand for Jury Trial, Civil Action No. 3:08-cv-92-JTC, U.S.D.C., Northern District of Georgia, Newnan Division, Oct. 16, 2008, 8 pages, U.S.
*Southwire Company v. Cerro Wire Inc.*, Defendant Cerro Wire Inc.'s Motion to Stay Pending Reexmination of the Patent-In-Suit, Civil Action No. 3:08-cv-92-JTC, U.S.D.C., Northern District of Georgia, Newnan Division, Dec. 12, 2008, 11 pages, U.S.
*Southwire Company v. Cerro Wire Inc.*, Defendant Cerro Wire, Inc.'s Response to Plaintiff's Motion to Dismiss Cerro's Invalidity Defenses Under 35 U.S.C. §§ 102 and 103, Civil Action No. 3:08-cv-92-JTC, U.S.D.C., Northern District of Georgia, Newnan Division, Jan. 16, 2009, 7 pages, U.S.
*Southwire Company v. Cerro Wire Inc.*, Defendant Cerro Wire's Reply Memorandum in Support of Its Motion to Stay Pending

(56) References Cited

OTHER PUBLICATIONS

Reexmination of the Patent-In-Suit, Civil Action No. 3:08-cv-92-JTC, U.S.D.C., Northern District of Georgia, Newnan Division, Jan. 16, 2009, 17 pages, U.S.
*Southwire Company* v. *Cerro Wire Inc.*, Motion to Dismiss Cerro Wire Inc.'s Defenses of Invalidity Under 35 U.S.C. §§ 102 and 103, Civil Action No. 3:08-cv-92-JTC, U.S.D.C., Northern District of Georgia, Newnan Division, Jan. 2, 2009, 19 pages, U.S.
*Southwire Company* v. *Cerro Wire Inc.*, Order to Stay Pending Reexamination of the Patent in Suit, Civil Action No. 3:08-cv-92-JTC, U.S.D.C., Northern District of Georgia, Newnan Division, May 12, 2009, 13 pages, U.S.
*Southwire Company* v. *Cerro Wire Inc.*, Southwire Company's Reply in Support of Its Motion to Dismiss Cerro Wire Inc.'s Defenses of Invalidity Under 35 U.S.C. §§ 102 and 103 and Further Opposition to Cerro Wire Inc.'s Motion for Stay Pending Reexamination of the Patent in Suit, Civil Action No. 3:08-cv-92-JTC, U.S.D.C., Northern District of Georgia, Newnan Division, Jan. 26, 2009, 16 pages, U.S.
*Southwire Company* v. *Cerro Wire Inc.*, Southwire's Opposition to Defendant's Motion for Stay Pending Reexamination of the Patent-In-Suit, Civil Action No. 3:08-cv-92-JTC, U.S.D.C., Northern District of Georgia, Newnan Division, Jan. 2, 2009, 79 pages, U.S.
*Southwire Company* v. *Cerro Wire, Inc.*, Complaint for Patent Infringement and Demand for Jury Trial (with Exhibit A), Civil Action No. 3:08-cv-92-JTC, U.S.D.C., Northern District of Georgia, Newnan Division, Aug. 12, 2008, 16 pages, U.S.
*Southwire Company* v. *Encore Wire Corporation and Cerro Wire Inc.*, Plaintiff's Answer to Encore Wire Corporation's First Amended Answer, Affirmative Defenses, and Counterclaims, Civil Action No. 6:09-cv-289-LED, U.S.D.C., Eastern District of Texas, Tyler Division, Feb. 12, 2010, 17 pages, U.S.
*Southwire Company* v. *Encore Wire Corporation and Cerro Wire Inc.*, Plaintiff's Opening Claim Construction Brief, Civil Action No. 6:09-cv-289-LED, U.S.D.C., Eastern District of Texas, Tyler Division, Sep. 7, 2010, 103 pages, U.S.
*Southwire Company* v. *Encore Wire Corporation and Cerro Wire Inc.*, Joint Claim Construction Chart, Civil Action No. 6:09-cv-289-LED, U.S.D.C., Eastern District of Texas, Tyler Division, Oct. 7, 2010, 11 pages, U.S.
*Southwire Company* v. *Encore Wire Corporation and Cerro Wire Inc.*, Plaintiff's Claim Construction Reply Brief, Civil Action No. 6:09-cv-289-LED, U.S.D.C., Eastern District of Texas, Tyler Division, Oct. 7, 2010, 67 pages, U.S.
Southwire Company, Amended Response in Inter Partes Reexamination of U.S. Pat. No. 7,411,129 (U.S. Appl. No. 95/000,403, filed Apr. 30, 2010), 19 pages, U.S.
Southwire Company, Appeal Brief in Inter Partes Reexamination of U.S. Pat. No. 7,749,024 (U.S. Appl. No. 95/000,573, filed Dec. 31, 2012), 67 pages, U.S.
Southwire Company, Appeal Brief in Inter Partes Reexamination of U.S. Pat. No. 7,749,024 (U.S. Appl. No. 95/000,594, filed Jan. 28, 2013), 120 pages, U.S.
Southwire Company, Appeal Brief in Inter Partes Reexamination of U.S. Pat. No. 7,749,024 (U.S. Appl. No. 95/000,594, filed Aug. 5, 2013), 63 pages, U.S.
Southwire Company, Appeal Brief in Inter Partes Reexamination of U.S. Pat. No. 8,043,119 (U.S. Appl. No. 95/000,695, filed Dec. 10, 2014), 34 pages, U.S.
Southwire Company, Appeal Brief in Inter Partes Reexamination of U.S. Pat. No. 7,557,301 (U.S. Appl. No. 95/000,696, filed May 21, 2014), 134 pages, U.S.
Southwire Company, Appellant's Rebuttal in Inter Partes Reexamination of U.S. Pat. No. 7,749,024 (U.S. Appl. No. 95/000,573, filed Aug. 16, 2013), 14 pages, U.S.
Southwire Company, Appellant's Request for Rehearing Following a Decision on Appeal in Inter Partes Reexamination of U.S. Pat. No. 7,557,301 (U.S. Appl. No. 95/000,696, filed Oct. 29, 2015), 20 pages, U.S.
Southwire Company, Applicant's Request for Further Processing of European Application No. 06739714.1, Mar. 7, 2011, 16 pages, Germany.
Southwire Company, Applicant's Response in European Application No. 06739714.1, Jun. 25, 2012, 27 pages, Germany.
Southwire Company, Applicant's Response in European Application No. 06739714.1, Jun. 14, 2013, 15 pages, Germany.
Southwire Company, Applicant's Response in European Application No. 06770960.0, Sep. 29, 2009, 9 pages, Germany.
Southwire Company, Applicant's Response in European Application No. 06739714.1, Feb. 13, 2014, 12 pages, Germany.
Southwire Company, Confirmation of Hearing by Appellant in Inter Partes Reexamination of U.S. Pat. No. 7,557,301 (U.S. Appl. No. 95/000,696, filed Jun. 29, 2015), 5 pages, U.S.
Southwire Company, Corrected Appeal Brief in Inter Partes Reexamination of U.S. Pat. No. 7,557,301 (U.S. Appl. No. 95/000,696, filed Jun. 30, 2014), 133 pages, U.S.
Southwire Company, Corrected Response in Ex Parte Examination of U.S. Pat. No. 7,557,301 (U.S. Appl. No. 90/009,589, filed Jun. 7, 2010), 12 pages, U.S.
Southwire Company, Corrected Response in Inter Partes Reexamination of U.S. Pat. No. 7,749,024 (U.S. Appl. No. 95/000,594, filed Apr. 26, 2011), 85 pages, U.S.
Southwire Company, Cross-Respondent Patent Owner's Brief in Inter Partes Reexamination of U.S. Pat. No. 7,411,129 (U.S. Appl. No. 95/000,403, filed Sep. 13, 2010), 23 pages, U.S.
*Southwire Company, LLC* v. *Cerro Wire LLC*, Oral Arguments can be retrieved from <http://oralarguments.cafc.uscourts.gov/default.aspx?fl=2015-1117.mp3>, Appeals from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Oct. 7, 2015.
Southwire Company, LLC, Joint Appendix in *Southwire Company, LLC* v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, May 18, 2015, 289 pages.
Southwire Company, LLC, Notice of Appeal to the U.S. Court of Appeals for the Federal Circuit in Inter Partes Reexamination of U.S. Pat. No. 7,411,129 B2 (U.S. Appl. No. 95/000,403, filed Sep. 13, 2016), 3 pages, U.S.
Southwire Company, LLC, Principal and Response Brief of Cross-Appellant in *Encore Wire Corporation* v. *Southwire Company, LLC*, Appeal from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Apr. 23, 2015, 70 pages.
Southwire Company, LLC, Reply Brief of Cross-Appellant in *Encore Wire Corporation* v. *Southwire Company, LLC*, Appeal from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Jun. 25, 2015, 25 pages.
Southwire Company, LLC, Response and Reply Brief of Appellant in *Southwire, LLC* v. *Cerro Wire LLC*, Appeal from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Apr. 21, 2015, 60 pages.
Southwire Company, LLC, Response to Decision on Appeal in Inter Partes Reexamination of U.S. Pat. No. 8,043,119 (U.S. Appl. No. 95/000,695, filed Feb. 16), 2018, 286 pages, U.S.A.
Southwire Company, Notice of Appeal in Inter Partes Reexamination of U.S. Pat. No. 7,557,301 (U.S. Appl. No. 95/000,696, filed Mar. 21, 2014), 10 page, U.S.
Southwire Company, Notice of Appeal in Inter Partes Reexamination of U.S. Pat. No. 7,749,024 (U.S. Appl. No. 95/000,594, filed Nov. 26, 2012), 5 pages, U.S.

(56) References Cited

OTHER PUBLICATIONS

Southwire Company, Notice of Appeal to U.S. Court of Appeals for the Federal Circuit in Inter Partes Reexamination of U.S. Pat. No. 7,749,024 (U.S. Appl. No. 95/000,594, filed Sep. 19, 2014), 6 pages, U.S.

Southwire Company, Notice of Election to Participate and Notice of Cross-Appeal to the U.S. Court of Appeals for the Federal Circuit in Inter Partes Reexamination of U.S. Pat. No. 7,749,024 (U.S. Appl. No. 95/000,573, filed Jan. 2, 2015), 14 pages, U.S.

Southwire Company, Opening Brief in *Southwire Company v. Cerro Wire, Inc.*, U.S. Court of Appeals for the Federal Circuit Case No. 2016-2287 (relating to U.S. Pat. No. 7,557,301, Control/U.S. Appl. No. 95/000,696, filed Oct. 14, 2016), 131 pages.

Southwire Company, Opening Brief of Appellant in *Southwire Company v. Cerro Wire, Inc.*, Appeal from United States Patent and Trademark Office, Patent Trial and Appeal Board in No. 2014-005956, United States Court of Appeals for the Federal Circuit, 15/1117, -1118, Dec. 29, 2014, 63 pages, U.S.

Southwire Company, Patent Owner Comments on Request for Rehearing and Petition Under 37 C.F.R. § 41.3 to Strike Requester's Improper Paper in Inter Partes Reexamination of U.S. Pat. No. 8,043,119 (U.S. Appl. No. 95/000,695, filed Mar. 16, 2018), 53 pages, U.S.A.

Southwire Company, Patent Owner's Agenda for Interview with the Examiner for Ex Parte Reexamination of U.S. Pat. No. 8,382,518 (U.S. Appl. No. 96/000,144, filed Apr. 28, 2017), 9 pages, U.S.A.

Southwire Company, Patent Owner's Appeal Brief in Inter Partes Reexamination of U.S. Pat. No. 7,411,129 (U.S. Appl. No. 95/000,403, filed Sep. 13, 2010), 30 pages, U.S.

Southwire Company, Patent Owner's Response to Non-Final Office Action, including Written Statement of May 3, 2017 Interview in Ex Parte Reexamination of U.S. Pat. No. 8,382,518 (U.S. Appl. No. 96/000,144, filed May 22, 2017), 343 pages, U.S.A.

Southwire Company, Patent Owner's Response to Office Action for U.S. Appl. No. 14/858,872, dated Mar. 17, 2017, 11 pages, U.S.A.

Southwire Company, Patent Owner's Response to Request for Rehearing in Inter Partes Reexamination of U.S. Pat. No. 7,749,024 (U.S. Appl. No. 95/000,573, filed May 22, 2014), 5 pages, U.S.

Southwire Company, Patent Owner's Response, including Terminal Disclaimer and Information Disclosure Statement, to Final Office Action in Ex Parte Reexamination of U.S. Pat. No. 8,382,518 (U.S. Appl. No. 96/000,144), dated Sep. 14, 2017, 33 pages. U.S.A.

Southwire Company, Patent Owner's Written Statement of an Interview with the Examiner for Ex Parte Reexamination of U.S. Pat. No. 8,382,518 (U.S. Appl. No. 96/000,144, filed Dec. 2, 2016), 12 pages, U.S.

Southwire Company, Petition in Inter Partes Reexamination of U.S. Pat. No. 7,749,024 (U.S. Appl. No. 95/000,594, filed Jan. 28, 2013), 14 pages, U.S.

Southwire Company, Rebuttal Brief in Inter Partes Reexamination of U.S. Pat. No. 7,749,024 (U.S. Appl. No. 95/000,594, filed Jan. 6, 2014), 16 pages, U.S.

Southwire Company, Rebuttal Brief in Inter Partes Reexamination of U.S. Pat. No. 8,043,119 (U.S. Appl. No. 95/000,695, filed Mar. 4, 2015), 6 pages, U.S.

Southwire Company, Reply Brief of the Appellant in *Southwire Company v. Cerro Wire, Inc.*, U.S. Court of Appeals for the Federal Circuit Case No. 2016-2287 (relating to U.S. Pat. No. 7,557,301, Control/U.S. Appl. No. 95/000,696, filed Feb. 10, 2017), 37 pages.

Southwire Company, Reply in U.S. Appl. No. 12/017,222, dated Dec. 8, 2008, 17 pages, U.S.

Southwire Company, Reply in for U.S. Appl. No. 12/017,222, dated Dec. 12, 2008, 12 pages, U.S.

Southwire Company, Reply to Notice of Allowance for U.S. Appl. No. 13/274,052, dated Nov. 19, 2012, 23 pages, U.S.

Southwire Company, Reply to Notice of Allowance for U.S. Appl. No. 13/274,052, dated Dec. 19, 2012, 5 pages, U.S.

Southwire Company, Reply to Notice of Allowance for U.S. Appl. No. 13/774,677, dated Jul. 29, 2013, 24 pages, U.S.

Southwire Company, Reply to Notice of Allowance for U.S. Appl. No. 14/144,150, dated Feb. 17, 2015, 11 pages, U.S.

Southwire Company, Reply to Notice of Opposition in European Application No. 06770960.0, dated Jun. 9, 2014, 109 pages, Germany.

Southwire Company, Request for Oral Hearing in Inter Partes Reexamination of U.S. Pat. No. 7,557,301 (U.S. Appl. No. 95/000,696, filed Oct. 28, 2014), 5 pages, U.S.

Southwire Company, Respondent Brief in Inter Partes Reexamination of U.S. Pat. No. 8,043,119 (U.S. Appl. No. 95/000,695, filed Jan. 9, 2015), 25 pages, U.S.

Southwire Company, Response (Petition to Reopen and Request to Proposed Amendment) in Inter Partes Reexamination of U.S. Pat. No. 7,749,024 (U.S. Appl. No. 95/000,573, filed Oct. 17, 2012), 66 pages, U.S.

Southwire Company, Response in Ex Parte Examination of U.S. Pat. No. 7,557,301 (U.S. Appl. No. 90/009,589, filed Jun. 4, 2010), 79 pages, U.S.

Southwire Company, Response in Ex Parte Reexamination of U.S. Pat. No. 7,557,301 (U.S. Appl. No. 90/009,592, filed Jul. 8, 2010), 6 pages, U.S.

Southwire Company, Response in Ex Parte Reexamination of U.S. Pat. No. 7,557,301 (U.S. Appl. No. 90/009,592, filed Oct. 25, 2010), 76 pages, U.S.

Southwire Company, Response in Ex Parte Reexamination of U.S. Pat. No. 7,557,301 (U.S. Appl. No. 90/009,589 and U.S. Appl. No. 90/009,592, filed Dec. 16, 2010), 10 pages, U.S.

Southwire Company, Response in Ex Parte Reexamination of U.S. Pat. No. 7,557,301 (U.S. Appl. No. 90/009,589 and U.S. Appl. No. 90/009,592, filed Aug. 10, 2011), 21 pages, U.S.

Southwire Company, Response in Inter Partes Reexamination of U.S. Pat. No. 7,411,129 (U.S. Appl. No. 95/000,403, filed Feb. 5, 2009), 104 pages, U.S.

Southwire Company, Response in Inter Partes Reexamination of U.S. Pat. No. 7,411,129 (U.S. Appl. No. 95/000,403, filed Sep. 1, 2009), 27 pages, U.S.

Southwire Company, Response in Inter Partes Reexamination of U.S. Pat. No. 7,411,129 (U.S. Appl. No. 95/000,403, filed Apr. 29, 2010), 39 pages, U.S.

Southwire Company, Response in Inter Partes Reexamination of U.S. Pat. No. 7,411,129 (U.S. Appl. No. 95/000,403, filed Jun. 30, 2015), 5 pages, U.S.

Southwire Company, Response in Inter Partes Reexamination of U.S. Pat. No. 7,411,129 (U.S. Appl. No. 95/000,403, filed Jul. 31, 2010), 8 pages, U.S.

Southwire Company, Response in Inter Partes Reexamination of U.S. Pat. No. 7,411,129 (U.S. Appl. No. 95/000,403, filed Sep. 9, 2010), 8 pages, U.S.

Southwire Company, Response in Inter Partes Reexamination of U.S. Pat. No. 7,411,129 (U.S. Appl. No. 95/000,403, filed Jan. 30, 2015), 22 pages, U.S.

Southwire Company, Response in Inter Partes Reexamination of U.S. Pat. No. 7,749,024 (U.S. Appl. No. 95/000,573, filed Feb. 3, 2011), 50 pages, U.S.

Southwire Company, Response in Inter Partes Reexamination of U.S. Pat. No. 7,749,024 (U.S. Appl. No. 95/000,594, filed Apr. 11, 2011), 78 pages, U.S.

Southwire Company, Response in Inter Partes Reexamination of U.S. Pat. No. 8,043,119 (U.S. Appl. No. 95/000,695, filed May 16, 2013), 163 pages, U.S.

Southwire Company, Response in Inter Partes Reexamination of U.S. Pat. No. 8,043,119 (U.S. Appl. No. 95/000,695, filed Apr. 14, 2014), 37 pages, U.S.

Southwire Company, Response in Inter Partes Reexamination of U.S. Pat. No. 8,043,119 (U.S. Appl. No. 95/000,695, filed Sep. 29, 2014), 7 pages, U.S.

Southwire Company, Response in Inter Partes Reexamination of U.S. Pat. No. 7,557,301 (U.S. Appl. No. 95/000,696, filed Feb. 11, 2013), 146 pages, U.S.

Southwire Company, Response in Inter Partes Reexamination of U.S. Pat. No. 7,557,301 (U.S. Appl. No. 95/000,696, filed Dec. 6, 2013), 19 pages, U.S.

(56) References Cited

OTHER PUBLICATIONS

Southwire Company, Response to Action Closing Prosecution in Inter Partes Reexamination of U.S. Pat. No. 7,749,024 (U.S. Appl. No. 95/000,594, filed Sep. 10, 2012), 67 pages, U.S.
Southwire Company, Response to Decision on Appeal in Inter Partes Reexamination of U.S. Pat. No. 7,411,129 (U.S. Appl. No. 95/000,403, filed Feb. 28, 2014), 151 pages, U.S.
Southwire Company, Response to Non-final Office Action for Ex Parte Reexamination of U.S. Pat. No. 8,382,518 (U.S. Appl. No. 96/000,144, filed Nov. 8, 2016), 104 pages, U.S.
Southwire Company, Response to Notice of Allowance for U.S. Appl. No. 12/497,586, dated Nov. 8, 2012, 9 pages, U.S.
Southwire Company, Response to Notice to File Corrected Papers for U.S. Appl. No. 12/497,586, dated Nov. 16, 2012, 12 pages, U.S.
Southwire Company, Response to Nov. 2, 2017 Non-Final Office Action and Terminal Disclaimer for U.S. Appl. No. 15/590,881, dated May 2, 2018, 44 pages, U.S.A.
Southwire Company, Response to Office Action for U.S. Appl. No. 10/952,294, dated Dec. 12, 2006, 14 pages, U.S.
Southwire Company, Response to Office Action for U.S. Appl. No. 10/952,294, dated May 14, 2007, 20 pages, U.S.
Southwire Company, Response to Office Action for U.S. Appl. No. 10/952,294, dated Jul. 11, 2007, 27 pages, U.S.
Southwire Company, Response to Office Action for U.S. Appl. No. 10/952,294, dated Aug. 9, 2007, 19 pages, U.S.
Southwire Company, Response to Office Action for U.S. Appl. No. 10/952,294, dated Sep. 14, 2007, 7 pages, U.S.
Southwire Company, Response to Office Action for U.S. Appl. No. 10/952,294, dated Feb. 15, 2008, 9 pages, U.S.
Southwire Company, Response to Office Action for U.S. Appl. No. 11/120,487, dated Dec. 9, 2005, 8 pages, U.S.
Southwire Company, Response to Office Action for U.S. Appl. No. 11/120,487, dated Apr. 28, 2006, 16 pages, U.S.
Southwire Company, Response to Office Action for U.S. Appl. No. 11/135,807, dated Apr. 27, 2006, 14 pages, U.S.
Southwire Company, Response to Office Action for U.S. Appl. No. 11/135,986, dated Jan. 12, 2007, 14 pages, U.S.
Southwire Company, Response to Office Action for U.S. Appl. No. 11/675,441, dated Jun. 30, 2008, 47 pages, U.S.
Southwire Company, Response to Office Action for U.S. Appl. No. 11/675,441, dated Apr. 6, 2009, 15 pages, U.S.
Southwire Company, Response to Office Action for U.S. Appl. No. 11/675,441, dated Sep. 4, 2009, 12 pages, U.S.
Southwire Company, Response to Office Action for U.S. Appl. No. 11/675,441, dated Mar. 24, 2010, 18 pages, U.S.
Southwire Company, Response to Office Action for U.S. Appl. No. 11/858,766, dated Dec. 9, 2008, 13 pages, U.S.
Southwire Company, Response to Office Action for U.S. Appl. No. 12/017,222, dated Oct. 21, 2008, 26 pages, U.S.
Southwire Company, Response to Office Action for U.S. Appl. No. 12/497,586, dated Jan. 9, 2012, 21 pages, U.S.
Southwire Company, Response to Office Action for U.S. Appl. No. 12/497,586, dated May 30, 2012, 15 pages, U.S.
Southwire Company, Response to Office Action for U.S. Appl. No. 12/787,877, dated Apr. 28, 2011, 44 pages, U.S.
Southwire Company, Response to Office Action for U.S. Appl. No. 13/274,052, dated May 23, 2012, 14 pages, U.S.
Southwire Company, Response to Request for Inter Partes Reexamination of U.S. Pat. No. 7,411,129 (U.S. Appl. No. 95/000,403, filed Oct. 21, 2008), 28 pages, U.S.
Southwire Company, Response to Respondent's Appeal Brief in Inter Partes Reexamination of U.S. Pat. No. 7,557,301 (U.S. Appl. No. 95/000,696, filed Jul. 3, 2014), 10 pages, U.S.
Southwire Company, Response to Respondent's Rebuttal Brief in Inter Partes Reexamination of U.S. Pat. No. 7,557,301 (U.S. Appl. No. 95/000,696, filed Sep. 29, 2014), 6 pages, U.S.
Southwire Company, Supplemental Response in Ex Parte Examination of U.S. Pat. No. 7,557,301 (U.S. Appl. No. 90/009,589, filed Jun. 11, 2010), 2010, 13 pages, U.S.
Southwire Company, Supplemental Response in Ex Parte Examination of U.S. Pat. No. 7,557,301 (U.S. Appl. No. 90/009,589, filed Sep. 22, 2010), 47 pages, U.S.
Southwire Company, Supplemental Response to Office Action for U.S. Appl. No. 13/274,052, dated Jul. 16, 2012, 37 pages, U.S.
Southwire Company, Unopposed Motion for Extension of Time to File Appellant's Opening Brief in *Southwire Company v. Cerro Wire LLC*, U.S. Court of Appeals for the Federal Circuit No. 2016-2643 (relating to U.S. Pat. No. 7,411,129, Control/U.S. Appl. No. 95/000,403, filed Dec. 7, 2016), 8 pages.
Southwire, "Romex® SIMpull® Type NM-B", Product Specifications, retrieved from <http://www.southwire.com/products/RomexSIMpullTypeNMBOEM.htm> on Mar. 12, 2015.
Thermoplastic-Insulated Wires and Cables, UL 83, in CSA Standards Update Service, Thirteenth Edition, Nov. 15, 2003, 186 pages.
Translation of Submission of Oct. 22, 2013 from IPSILON to the EPO; Re: Opposition to European Patent EP 1899988, received Oct. 29, 2013, 21 pages.
Trotignon, J. P., et al., "Extrusion des Thermoplastiques, in Matieres Plastiques," Editons Nathan, 1996, p. 148.
U.S. Appl. No. 60/544,224, filed Feb. 12, 2004, Carlson et al., 6 pp.
U.S. Court of Appeals for the Federal Circuit, Opinion (PTAB Affirmed) in *Southwire Company v. Cerro Wire, Inc.*, U.S. Court of Appeals for the Federal Circuit Case No. 2016-2287 (relating to U.S. Pat. No. 7,557,301, Control/U.S. Appl. No. 95/000,696, filed Sep. 8, 2017), 11 pages.
UL Standard for Safety for Nonmetallic-Sheathed Cables, UL 719, Twelfth Edition, Feb. 9, 2006.
Ultra-X TM, Une nouvelle dimension dans les cables NMD-7, ultra-X product brochure, Northern Telecom—Power Cable Division, Apr. 11, 1977, 28 pages.
Underwriters Laboratories Inc. Standard for Safety UL-719 for Nonmetallic-Sheathed Cables, Eleventh Edition, Mar. 21, 2002, 46 pages.
United States Court of Appeals for the Federal Circuit, Order (Dismissing Proceeding) in *Southwire Company v. Cerro Wire LLC*, U.S. Court of Appeals for the Federal Circuit No. 2016-2643 (relating to U.S. Pat. No. 7,411,129, Control/U.S. Appl. No. 95/000,403, filed Jan. 27, 2017), 2 pages.
United States Court of Appeals for the Federal Circuit, Order on Petition for Panel Rehearing and Rehearing En Banc—Denied—in *Southwire Company v. Cerro Wire, LLC*, U.S. Court of Appeals for the Federal Circuit Case No. 2016-2287, Dec. 5, 2017, 2 pages.
United States Court of Appeals, *Encore Wire Corporation v. Southwire Company, LLC*, Order (Dismissed), Appeals from United States Patent and Trademark Office, Patent Trial and Appeal Board in No. 2014-000135 (relating to U.S. Pat. No. 7,749,024 and U.S. Appl. No. 95/000,573), United States Court of Appeals for the Federal Circuit, 2015-1249, -1250, Oct. 20, 2015, 2 pages.
United States Court of Appeals, *Southwire Company, LLC v. Cerro Wire, LLC*, Judgment (Affirmed), Appeals from United States Patent and Trademark Office, Patent Trial and Appeal Board in No. 2014-005956 (relating to U.S. Pat. No. 7,749,024 and U.S. Appl. No. 95/000,594), United States Court of Appeals for the Federal Circuit, 2015-1117, -1118, Oct. 20, 2015, 2 pages.
United States Patent and Trade Mark Office, Action Closing Prosecution in Inter Partes Reexamination of U.S. Pat. No. 7,749,024 (U.S. Appl. No. 95/000,573, filed Jul. 9, 2012), 59 pages, U.S.
United States Patent and Trade Mark Office, Board Decision, Examiner Affirmed in Part in Inter Partes Reexamination of U.S. Pat. No. 7,749,024 (U.S. Appl. No. 95/000,573), dated Mar. 28, 2014, 20 pages, U.S.
United States Patent and Trade Mark Office, Board Decision, Reconsideration Denied in Part in Inter Partes Reexamination of U.S. Pat. No. 7,749,024 (U.S. Appl. No. 95/000,573), dated Nov. 3, 2014, 5 pages, U.S.
United States Patent and Trade Mark Office, Examiner's Answer in Inter Partes Reexamination of U.S. Pat. No. 7,749,024 (U.S. Appl. No. 95/000,573), dated Jul. 16, 2013, 3 pages, U.S.
United States Patent and Trade Mark Office, Office Action in Inter Partes Reexamination of U.S. Pat. No. 7,749,024 (U.S. Appl. No. 95/000,573), dated Dec. 3, 2010, 12 pages, U.S.

(56) References Cited

OTHER PUBLICATIONS

United States Patent and Trade Mark Office, Office Communication in Inter Partes Reexamination of U.S. Pat. No. 7,749,024 (U.S. Appl. No. 95/000,573), dated Sep. 4, 2013, 3 pages, U.S.
United States Patent and Trade Mark Office, Order Granting Inter Partes Reexamination of U.S. Pat. No. 7,749,024 (U.S. Appl. No. 95/000,573, filed Nov. 9, 2010), 22 pages, U.S.
United States Patent and Trade Mark Office, Petition Decisions in Inter Partes Reexamination of U.S. Pat. No. 7,749,024 (U.S. Appl. No. 95/000,573, filed Apr. 4, 2013, Jun. 19, 2013 and Jun. 21, 2013), 25 pages, U.S.
United States Patent and Trade Mark Office, Right of Appeal Notice in Inter Partes Reexamination of U.S. Pat. No. 7,749,024 (U.S. Appl. No. 95/000,573, filed Sep. 28, 2012), 58 pages, U.S.
United States Patent and Trademark Office, Action Closing Prosecution in Inter Partes Reexamination of U.S. Pat. No. 7,749,024 (U.S. Appl. No. 95/000,594, filed Aug. 10, 2012), 166 pages, U.S.
United States Patent and Trademark Office, Action Closing Prosecution for Inter Partes Reexamination of U.S. Pat. No. 8,043,119 (U.S. Appl. No. 95/000,695, filed Jul. 2, 2014), 104 pages, U.S.
United States Patent and Trademark Office, Closing Action for Inter Partes Reexamination of U.S. Pat. No. 7,411,129 and Office Action (U.S. Appl. No. 95/000,403, filed Jul. 1, 2009), 41 pages, U.S.
United States Patent and Trademark Office, Closing Action in Inter Partes Reexamination of U.S. Pat. No. 7,557,301 (U.S. Appl. No. 95/000,696, filed Nov. 6, 2013), 81 pages, U.S.
United States Patent and Trademark Office, Decision on Examiner's Determination (Affirmed) in Inter Partes Reexamination of U.S. Pat. No. 7,411,129 B2 (U.S. Appl. No. 95/000,403), dated Jul. 13, 2016, 20 pages, U.S.
United States Patent and Trademark Office, Decision to Merge Proceedings in Ex Parte Reexamination of U.S. Pat. No. 7,557,301 (U.S. Appl. No. 90/009,589 and U.S. Appl. No. 90/009,592, filed Nov. 23, 2010), 10 pages, U.S.
United States Patent and Trademark Office, Decision Vacating Reexam in Inter Partes Reexamination of U.S. Pat. No. 7,749,024 (U.S. Appl. No. 95/000,573, filed Aug. 2, 2016), 6 pages, U.S.
United States Patent and Trademark Office, Decision: Rehearing Granted in Part, in Inter Partes Reexamination of U.S. Pat. No. 7,557,301 (U.S. Appl. No. 95/000,696, filed May 2, 2016), 17 pages, U.S.A.
United States Patent and Trademark Office, Electronic Approval of Terminal Disclaimer for U.S. Appl. No. 15/590,881, filed May 2, 2018, 1 pages, U.S.A.
United States Patent and Trademark Office, Ex Parte Reexamination Ordered of U.S. Pat. No. 8,382,518 (U.S. Appl. No. 96/000,144, filed Sep. 8, 2016), 2 pages, U.S.
United States Patent and Trademark Office, Ex Parte Reexamination Certificate for U.S. Appl. No./Control No. 96/000,144 (U.S. Pat. No. 8,382,518, filed Jan. 26, 2018), 2 pages, U.S.A.
United States Patent and Trademark Office, Examiner's Answer in Inter Partes Reexamination of U.S. Pat. No. 7,749,024 (U.S. Appl. No. 95/000,594), dated Dec. 4, 2013, 3 pages, U.S.
United States Patent and Trademark Office, Examiner's Answer in Inter Partes Reexamination of U.S. Pat. No. 8,043,119 (U.S. Appl. No. 95/000,695), dated Feb. 4, 2015, 3 pages, U.S.
United States Patent and Trademark Office, Examiner's Answer in Inter Partes Reexamination of U.S. Pat. No. 7,557,301 (U.S. Appl. No. 95/000,696), dated Aug. 28, 2014, 3 pages, U.S.
United States Patent and Trademark Office, Examiner's Answer to Appeal Brief in Inter Partes Reexamination of U.S. Pat. No. 7,411,129 (U.S. Appl. No. 95/000/403), dated Sep. 21, 2012, 12 pages, U.S.
United States Patent and Trademark Office, Examiner's Determination on Patent Owner and Requestor Comments after Board Decision in Inter Partes Reexamination of U.S. Pat. No. 7,411,129 (U.S. Appl. No. 95/000,403), dated Dec. 30, 2014, 15 pages, U.S.
United States Patent and Trademark Office, Examiner's Ex Parte Reexamination Interview Summary for Ex Parte Reexamination of U.S. Pat. No. 8,382,518 (U.S. Appl. No. 96,000,144, filed Jan. 9, 2017), 3 pages, U.S.A.
United States Patent and Trademark Office, Final Office Action in Ex Parte Reexamination of U.S. Pat. No. 8,382,518 (U.S. Appl. No. 96/000/144), dated Jul. 14, 2017, 74 pages, U.S.A.
United States Patent and Trademark Office, Interview Attachment (Miscellaneous Internal Document) in Ex Parte Reexamination of U.S. Pat. No. 8,382,518 (U.S. Appl. No. 96/000,144, filed May 3, 2017), 14 pages. U.S.A.
United States Patent and Trademark Office, Issuance of Supplemental Examination Certificate U.S. 8,382,518 F1 (U.S. Appl. No. 96/000,144, filed Aug. 16, 2016), 2 pages, U.S.
United States Patent and Trademark Office, Miscellaneous Action with SSP for U.S. Appl. No. 10/952,294, filed Mar. 4, 2008, 9 pages, U.S.
United States Patent and Trademark Office, Notice of Allowance for U.S. Appl. No. 10/952,294, dated Oct. 12, 2007, 8 pages, U.S.
United States Patent and Trademark Office, Notice of Allowance for U.S. Appl. No. 10/952,294, dated Dec. 31, 2007, 9 pages, U.S.
United States Patent and Trademark Office, Notice of Allowance for U.S. Appl. No. 10/952,294, dated Mar. 25, 2008, 12 pages, U.S.
United States Patent and Trademark Office, Notice of Allowance for U.S. Appl. No. 10/952,294, dated Apr. 30, 2008, 11 pages, U.S.
United States Patent and Trademark Office, Notice of Allowance for U.S. Appl. No. 10/952,204, dated Jun. 27, 2008, 9 pages, U.S.
United States Patent and Trademark Office, Notice of Allowance for U.S. Appl. No. 11/675,441, dated Apr. 6, 2010, 10 pages, U.S.
United States Patent and Trademark Office, Notice of Allowance for U.S. Appl. No. 12/017,222, dated Dec. 5, 2008, 17 pages, U.S.
United States Patent and Trademark Office, Notice of Allowance for U.S. Appl. No. 12/017,222, dated Jan. 8, 2009, 15 pages, U.S.
United States Patent and Trademark Office, Notice of Allowance for U.S. Appl. No. 12/017,222, dated Feb. 27, 2009, 11 pages, U.S.
United States Patent and Trademark Office, Notice of Allowance for U.S. Appl. No. 12/497,586, dated Aug. 8, 2012, 24 pages, U.S.
United States Patent and Trademark Office, Notice of Allowance for U.S. Appl. No. 12/497,586, dated Nov. 18, 2013, 17 pages, U.S.
United States Patent and Trademark Office, Notice of Allowance for U.S. Appl. No. 12/787,877, dated Aug. 3, 2011, 9 pages, U.S.
United States Patent and Trademark Office, Notice of Allowance for U.S. Appl. No. 13/274,052, dated Aug. 17, 2012, 22 pages, U.S.
United States Patent and Trademark Office, Notice of Allowance for U.S. Appl. No. 13/274,052, dated Dec. 12, 2012, 16 pages, U.S.
United States Patent and Trademark Office, Notice of Allowance for U.S. Appl. No. 13/774,677, dated Apr. 30, 2013, 9 pages, U.S.
United States Patent and Trademark Office, Notice of Allowance for U.S. Appl. No. 13/774,677, dated Aug. 21, 2013, 21 pages, U.S.
United States Patent and Trademark Office, Notice of Allowance for U.S. Appl. No. 14/144,150, dated Nov. 18, 2014, 24 pages, U.S.
United States Patent and Trademark Office, Notice of Allowance for U.S. Appl. No. 14/144,150, dated May 22, 2015, 6 pages, U.S.
United States Patent and Trademark Office, Notice of Allowance for U.S. Appl. No. 15/068,150, dated Jul. 19, 2016, 48 pages, U.S.
United States Patent and Trademark Office, Notice of Allowance for U.S. Appl. No. 14/858,872, dated Apr. 12, 2017, 8 pages, U.S.A.
United States Patent and Trademark Office, Notice of Hearing in Inter Partes Reexamination of U.S. Pat. No. 7,557,301 (U.S. Appl. No. 95/000,696, filed Jun. 8, 2015), 4 pages, U.S.
United States Patent and Trademark Office, Notice of Intent to Issue a Reexam Certificate in Inter Partes Reexamination of U.S. Pat. No. 7,749,024 (U.S. Appl. No. 95/000,594, filed Jul. 12, 2013), 14 pages, U.S.
United States Patent and Trademark Office, Notice of Intent to Issue Inter Partes Reexamination Certificate in Inter Partes Reexamination of U.S. Pat. No. 7,749,024 (U.S. Appl. No. 95/000,594) and Office Action, dated Jun. 7, 2016, 7 pages, U.S.A.
United States Patent and Trademark Office, Notice of Intent to Issue an Ex Parte Reexam Certificate for U.S. Appl. No./Control No. 96/000,144, filed Oct. 10, 2017, 7 pages, U.S.A.

(56) References Cited

OTHER PUBLICATIONS

United States Patent and Trademark Office, Notice of Intent to Reissue in Ex Parte Reexamination of U.S. Pat. No. 7,557,301 (U.S. Appl. No. 90/009,589 and U.S. Appl. No. 90/009,592, filed Sep. 21, 2011), 8 pages, U.S.

United States Patent and Trademark Office, Notification of Reopening Prosecution Due to Information Disclosure Statement Filed after of a Notice of Allowance for U.S. Appl. No. 14/858,872, dated Feb. 8, 2016, 6 pages, U.S.A.

United States Patent and Trademark Office, Office Action for U.S. Appl. No. 14/858,872, dated Dec. 22, 2016, 5 pages, U.S.A.

United States Patent and Trademark Office, Office Action for U.S. Appl. No. 10/952,294, dated Jul. 12, 2006, 17 pages, U.S.

United States Patent and Trademark Office, Office Action for U.S. Appl. No. 10/952,294, dated Mar. 14, 2007, 12 pages, U.S.

United States Patent and Trademark Office, Office Action for U.S. Appl. No. 10/952,294, dated May 30, 2007, 8 pages, U.S.

United States Patent and Trademark Office, Office Action for U.S. Appl. No. 10/952,294, dated Aug. 7, 2007, 12 pages, U.S.

United States Patent and Trademark Office, Office Action for U.S. Appl. No. 11/120,487, dated Nov. 2, 2005, 6 pages, U.S.

United States Patent and Trademark Office, Office Action for U.S. Appl. No. 11/120,487, dated Jan. 5, 2006, 10 pages, U.S.

United States Patent and Trademark Office, Office Action for U.S. Appl. No. 11/120,487, dated Jun. 8, 2006, 15 pages, U.S.

United States Patent and Trademark Office, Office Action for U.S. Appl. No. 11/135,807, dated Dec. 15, 2005, 10 pages, U.S.

United States Patent and Trademark Office, Office Action for U.S. Appl. No. 11/135,807, dated Jun. 8, 2006, 15 pages, U.S.

United States Patent and Trademark Office, Office Action for U.S. Appl. No. 11/135,986, dated Jul. 12, 2006, 10 pages, U.S.

United States Patent and Trademark Office, Office Action for U.S. Appl. No. 11/135,986, dated Mar. 14, 2007, 11 pages, U.S.

United States Patent and Trademark Office, Office Action for U.S. Appl. No. 11/313,596, dated Mar. 20, 2007, 16 pages, U.S.

United States Patent and Trademark Office, Office Action for U.S. Appl. No. 11/410,820, dated Jun. 11, 2009, 10 pages, U.S.

United States Patent and Trademark Office, Office Action for U.S. Appl. No. 11/675,441, dated Dec. 28, 2007, 5 pages, U.S.

United States Patent and Trademark Office, Office Action for U.S. Appl. No. 11/675,441, dated Oct. 6, 2008, 13 pages, U.S.

United States Patent and Trademark Office, Office Action for U.S. Appl. No. 11/675,441, dated Jun. 25, 2009, 11 pages, U.S.

United States Patent and Trademark Office, Office Action for U.S. Appl. No. 11/675,441, dated Dec. 9, 2009, 6 pages, U.S.

United States Patent and Trademark Office, Office Action for U.S. Appl. No. 11/858,766, dated Jun. 9, 2008, 8 pages, U.S.

United States Patent and Trademark Office, Office Action for U.S. Appl. No. 11/858,766, dated Feb. 9, 2009, 11 pages, U.S.

United States Patent and Trademark Office, Office Action for U.S. Appl. No. 12/017,222, dated Aug. 7, 2008, 16 pages, U.S.

United States Patent and Trademark Office, Office Action for U.S. Appl. No. 12/497,586, dated Jul. 7, 2011, 6 pages, U.S.

United States Patent and Trademark Office, Office Action for U.S. Appl. No. 12/497,586, dated Mar. 30, 2012, 20 pages, U.S.

United States Patent and Trademark Office, Office Action for U.S. Appl. No. 12/787,877, dated Oct. 28, 2010, 13 pages, U.S.

United States Patent and Trademark Office, Office Action for U.S. Appl. No. 13/274,052, dated Nov. 23, 2011, 8 pages, U.S.

United States Patent and Trademark Office, Office Action for U.S. Appl. No. 14/620,963, dated Apr. 6, 2016, 16 pages, U.S.A.

United States Patent and Trademark Office, Office Action for U.S. Appl. No. 14/858,872, dated Sep. 9, 2016, 52 pages, U.S.

United States Patent and Trademark Office, Office Action for U.S. Appl. No. 15/590,881, dated Nov. 2, 2017, 11 pages, U.S.A.

United States Patent and Trademark Office, Office Action for Ex Parte Reexam of U.S. Pat. No. 8,382,518 (U.S. Appl. No. 96/000,144), dated Sep. 8, 2016, 36 pages, U.S.

United States Patent and Trademark Office, Office Action for Inter Partes Reexamination of U.S. Pat. No. 8,043,119 (U.S. Appl. No. 95/000,695), dated Feb. 14, 2014, 116 pages, U.S.

United States Patent and Trademark Office, Office Action in Ex Parte Examination of U.S. Pat. No. 7,557,301 (U.S. Appl. No. 90/009,589), dated May 4, 2010, 31 pages, U.S.

United States Patent and Trademark Office, Office Action in Ex Parte Reexamination of U.S. Pat. No. 7,557,301 (U.S. Appl. No. 90/009,592), dated Sep. 24, 2010, 16 pages, U.S.

United States Patent and Trademark Office, Office Action in Ex Parte Reexamination of U.S. Pat. No. 7,557,301 (U.S. Appl. No. 90/009,589 and U.S. Appl. No. 90/009,592), dated Jun. 23, 2011, 24 pages, U.S.

United States Patent and Trademark Office, Office Action in Ex Parte Reexamination of U.S. Pat. No. 8,382,518 (U.S. Appl. No. 96/000,144), dated Mar. 20, 2017, 149 pages, U.S.A.

United States Patent and Trademark Office, Order Granting Ex Parte Examination of U.S. Pat. No. 7,557,301 (U.S. Appl. No. 90/009,589, filed Dec. 18, 2009), 20 pages, U.S.

United States Patent and Trademark Office, Order Granting Ex Parte Reexamination of U.S. Pat. No. 7,557,301 (U.S. Appl. No. 90/009,592, filed Feb. 5, 2010), 12 pages, U.S.

United States Patent and Trademark Office, Order Granting Inter Partes Reexamination of U.S. Pat. No. 7,411,129 and Office Action (U.S. Appl. No. 95/000,403), dated Dec. 5, 2008, 50 pages, U.S.

United States Patent and Trademark Office, Order Granting Inter Partes Reexamination of U.S. Pat. No. 7,749,024 (U.S. Appl. No. 95/000,594) and Office Action, dated Feb. 11, 2011, 46 pages, U.S.

United States Patent and Trademark Office, Order Granting Inter Partes Reexamination of U.S. Pat. No. 8,043,119 (U.S. Appl. No. 95/000,695) and Office Action, dated Nov. 13, 2012, 74 pages, U.S.

United States Patent and Trademark Office, Order Granting Reexamination and Office Action in Inter Partes Reexamination of U.S. Pat. No. 7,557,301 (U.S. Appl. No. 95/000,696), dated Dec. 11, 2012, 43 pages, U.S.

United States Patent and Trademark Office, Patent Board Decision on Appeal Affirming Examiner in Part for U.S. Appl. No./Control No. 95/000,695, dated Jan. 16, 2018, 37 pages, U.S.A.

United States Patent and Trademark Office, Patent Board Decision—Examiner Affirmed in Inter Partes Reexamination of U.S. Pat. No. 7,749,024 (U.S. Appl. No. 95/000,594, filed Jul. 16, 2014), 20 pages, U.S.

United States Patent and Trademark Office, Patent Board Decision, Examiner Affirmed In-Part in Inter Partes Reexamination of U.S. Pat. No. 7,411,129 (U.S. Appl. No. 95/000,403, filed Jan. 31, 2014), 24 pages, U.S.

United States Patent and Trademark Office, Patent Board Remand to Examiner in Inter Partes Reexamination of U.S. Pat. No. 7,411,129 (U.S. Appl. No. 95/000,403, filed Jun. 13, 2014), 9 pages, U.S.

United States Patent and Trademark Office, Petition Decision in Inter Partes Reexamination of U.S. Pat. No. 7,411,129 (U.S. Appl. No. 95/000,403, filed May 27, 2010), 6 pages, U.S.

United States Patent and Trademark Office, Petition Decision in Inter Partes Reexamination of U.S. Pat. No. 7,411,129 (U.S. Appl. No. 95/000,403, filed Jul. 7, 2010), 6 pages, U.S.

United States Patent and Trademark Office, Petition Decision in Inter Partes Reexamination of U.S. Pat. No. 7,557,301 (U.S. Appl. No. 95/000,696, filed Feb. 26, 2014), 4 pages, U.S.

United States Patent and Trademark Office, Petition Decision—Dismissed in Inter Partes Reexamination of U.S. Pat. No. 7,749,024 (U.S. Appl. No. 95/000,594, filed Nov. 20, 2012), 7 pages, U.S.

United States Patent and Trademark Office, Petition Decisions in Inter Partes Reexamination of U.S. Pat. No. 7,411,129 (U.S. Appl. No. 95/000,403, filed Aug. 10-11, 2010) 12 pages, U.S.

United States Patent and Trademark Office, Petition Decisions in Inter Partes Reexamination of U.S. Pat. No. 7,411,129 (U.S. Appl. No. 95/000,403, filed Oct. 19 and 22, 2010), 17 pages, U.S.

United States Patent and Trademark Office, Prioritized Examination Granted for U.S. Appl. No. 15/068,150, dated Jun. 16, 2016, 5 pages, U.S.A.

(56) References Cited

OTHER PUBLICATIONS

United States Patent and Trademark Office, Proceeding Forwarded to Patent Trial and Appeal Board Inter Partes Reexamination of U.S. Pat. No. 8,043,119 (U.S. Appl. No. 95/000,695, filed Mar. 23, 2015), 3 pages, U.S.
United States Patent and Trademark Office, PTAB Decision on Appeal in Inter Partes Reexamination of U.S. Pat. No. 7,557,301 (U.S. Appl. No. 95/000,696, filed Sep. 29, 2015), 28 pages, U.S.
United States Patent and Trademark Office, PTAB Docketing Notice in Inter Partes Reexamination of U.S. Pat. No. 7,411,129 (U.S. Appl. No. 95/000,403, filed Jun. 2, 2016), 3 pages, U.S.A.
United States Patent and Trademark Office, PTAB Docketing Notice Transmitted to Third Party Requestor in Inter Partes Reexamination of U.S. Pat. No. 7,411,129 (U.S. Appl. No. 95/000,403, filed Jun. 2, 2016), 5 pages, U.S.A.
United States Patent and Trademark Office, Reasons for Substantial New Question of Patentability Determination for U.S. Pat. No. 8,382,518 (U.S. Appl. No. 96/000,144, filed Aug. 16, 2016), 32 pages, U.S.
United States Patent and Trademark Office, Record of Oral Hearing Held: Aug. 19, 2015 in Inter Partes Reexamination of U.S. Pat. No. 7,557,301 (U.S. Appl. No. 95/000,696, filed Sep. 15, 2015), 44 pages, U.S.
United States Patent and Trademark Office, Reexam Petition Decision—Granted in Inter Partes Reexamination of U.S. Pat. No. 7,749,024 (U.S. Appl. No. 95/000,594, filed Oct. 25, 2013), 8 pages, U.S.
United States Patent and Trademark Office, Reexamination Certificate Issued for U.S. Pat. No. 7,557,301 (U.S Appl. No. 90/009,589 and U.S. Appl. No. 90/009,592), dated Dec. 27, 2011, 4 pages, U.S.
United States Patent and Trademark Office, Right of Appeal Notice in Inter Partes Reexamination of U.S. Pat. No. 7,749,024 (U.S. Appl. No. 95/000,594, filed Oct. 25, 2012), 162 pages, U.S.
United States Patent and Trademark Office, Right of Appeal Notice Prosecution for Inter Partes Reexamination of U.S. Pat. No. 8,043,119 (U.S. Appl. No. 95/000,695, filed Aug. 28, 2014), 7 pages, U.S.
United States Patent and Trademark Office, Right of Notice of Appeal in Inter Partes Reexamination of U.S. Pat. No. 7,411,129 (U.S. Appl. No. 95/000,403, filed Mar. 30, 2010), 23 pages, U.S.
United States Patent and Trademark Office, Right of Notice to Appeal in Inter Partes Reexamination of U.S. Pat. No. 7,557,301 (U.S. Appl. No. 95/000,696, filed Jan. 17, 2014), 83 pages, U.S.
United States Patent and Trademark Office, Right of Notice to Appeal in Inter Partes Reexamination of U.S. Pat. No. 7,557,301 (U.S. Appl. No. 95/000,696, filed Feb. 19, 2014), 87 pages, U.S.
United States Patent and Trademark Office, Summary of Applicant Initiated Interview for U.S. Appl. No. 15/590,881, dated Apr. 6, 2018, 4 pages, U.S.A.
United States Patent and Trademark Office, Supplemental Notice of Allowability for U.S. Appl. No. 13/274,052, dated Jan. 11, 2013, 3 pages, U.S.
U.S. Appl. No. 14/666,105, Preliminary Amendment Claims, dated Mar. 23, 2015, 5 pages.
U.S. Appl. No. 14/858,872, Preliminary Amendment Claims, dated Sep. 18, 2015, 6 pages.
Wild, Frank, "The Effects of Silicone Polymer Additions on the Processing and Properties of an Isotactic Propylene Homopolymer", Dissertation, Sep. 1995, The Manchester Metropolitan University.
Wiles, John, "Clarifying Confusing Cables", Home Power #66, Aug./Sep. 1998, pp. 82-84.
Witco Corporation, Brochure entitled "Fatty Acids, Glycerine, Triglycerides", (1997) (22pp).
Yellow 77® document, Ideal Industries GmbH, 1 pg., 2003.
United States Patent and Tradmark Office, Non-final Office Action for U.S. Appl. No. 12/406,454, dated Sep. 1, 2011, 22 pages, USA.
Southwire Company, Response to Sep. 1, 2011 Non-final Office Action for U.S. Appl. No. 12/406,454, dated Dec. 1, 2011, 15 pages, USA.
United States Patent and Tradmark Office, Final Office Action and Applicant Initiated Interview Summary for U.S. Appl. No. 12/406,454, dated Jan. 26, 2012, 12 pages, USA.
Southwire Company, Response to Jan. 26, 2012 Final Office Action for U.S. Appl. No. 12/406,454, dated Jul. 26, 2012, 21 pages, USA.
United States Patent and Tradmark Office, Non-final Office Action for U.S. Appl. No. 12/406,454, dated Apr. 8, 2013, 9 pages, USA.
Southwire Company, Response to Apr. 8, 2013 Non-final Office Action for U.S. Appl. No. 12/406,454, dated Oct. 8, 2013, 15 pages, USA.
United States Patent and Tradmark Office, Final Office Action for U.S. Appl. No. 12/406,454, dated Oct. 24, 2013, 14 pages, USA.
Southwire Company, Response to Oct. 24, 2013 Final Office Action for U.S. Appl. No. 12/406,454, dated Dec. 23, 2013, 19 pages, USA.
United States Patent and Tradmark Office, Advisory Action and Applicant Initiated Interview Summary for U.S. Appl. No. 12/406,454, dated Jan. 14, 2014, 10 pages, USA.
Southwire Company, Response to Jan. 14, 2014 Advisory Action for U.S. Appl. No. 12/406,454, dated Feb. 24, 2014, 25 pages, USA.
United States Patent and Tradmark Office, Non-final Office Action for U.S. Appl. No. 12/406,454, dated Mar. 11, 2014, 16 pages, USA.
Southwire Company, Response to Mar. 11, 2014 Non-final Office Action for U.S. Appl. No. 12/406,454, dated Jul. 11, 2014, 26 pages, USA.
United States Patent and Tradmark Office, Final Office Action for U.S. Appl. No. 12/406,454, dated Jul. 24, 2014, 12 pages, USA.
Southwire Company, Response to Jul. 24, 2014 Final Office Action for U.S. Appl. No. 12/406,454, dated Sep. 24, 2014, 16 pages, USA.
United States Patent and Tradmark Office, Advisory Office Action for U.S. Appl. No. 12/406,454, dated Oct. 1, 2014, 8 pages, USA.
Southwire Company, Response to Oct. 1, 2014 Advisory Office Action for U.S. Appl. No. 12/406,454, dated Oct. 29, 2014, 20 pages, USA.
United States Patent and Tradmark Office, Notice of Allowance and Examiner Initiated Interview Summary for U.S. Appl. No. 12/406,454, dated Dec. 3, 2014, 11 pages, USA.
United States Patent and Tradmark Office, Corrected Notice of Allowability for U.S. Appl. No. 12/406,454, dated Jan. 15, 2015, 3 pages, USA.
United States Patent and Tradmark Office, Non-final Office Action for U.S. Appl. No. 14/666,105, dated Aug. 31, 2017, 8 pages, USA.
Southwire Company, Response to Aug. 31, 2017 Non-final Office Action for U.S. Appl. No. 14/666,105, dated Feb. 20, 2018, 14 pages, USA.
United States Patent and Tradmark Office, Notice of Allowance for U.S. Appl. No. 14/666,105, dated Apr. 25, 2018, 7 pages, USA.
United States Patent and Trademark Office, Decision on Petition, Denying Patent Owner's Petition to Strike Requester's Improper Paper, Inter Partes Reexamination of U.S. Pat. No. 8,043,119 (U.S. Appl. No. 95/000,695, filed May 10, 2018), 10 pages, U.S.
United States Patent and Trademark Office, Order Remanding Inter Partes Reexamination to the Examiner, Inter Partes Reexamination of U.S. Pat. No. 8,043,119 (U.S. Appl. No. 95/000,685, filed Jun. 5, 2018), 10 pages, U.S.
United States Patent and Trademark Office, Office Action for U.S. Appl. No. 14/848,872, dated Jun. 14, 2018, 37 pages, U.S.
United States Patent and Trademark Office, Notice of Intent to Issue a Reexam Certificate in Inter Partes Reexamination of U.S. Pat. No. 7,557,301 (U.S. Appl. No. 95/000,696), dated May 18, 2018, 7 pages, U.S.
United States Patent and Trademark Office, Inter Partes Reexamination Certificate ($1535^{th}$) No. U.S. Pat. No. 7,557,301 C2 in Inter Partes Reexamination of U.S. Pat. No. 7,557,301 (U.S. Appl. No. 95/000,696, filed Jun. 14, 2018), 2 pages, U.S.
Cerro Wire, Inc., Requestor Comments in Response to Examiner's Determination, for Control No. 95/000,695, dated Dec. 13, 2018, 16 pages.
Southwire Company, Patent Owner's Comments in Response to Examiners' Determination, for Control No. 95/000,695, dated Dec. 14, 2018, 21 pages.
Cerro Wire, Inc., Requestor Reply to PO Comments to Examiner Determination, for Control No. 95/000,695, dated Jan. 14, 2019, 16 pages.
Southwire Company, Patent Owner's Reply to Requestor's Comments in Response to Examiners' Determination, for Control No. 95/000,695, dated Jan. 14, 2019, 20 pages.

(56) References Cited

OTHER PUBLICATIONS

United States Patent and Trademark Office, Patent Trial and Appeal Board Docketing Notice, for Control No. 95/000,695, Feb. 5, 2019, 3 pages, USA.
United States Patent and Trademark Office, Transmittal of Communication to Third Party Requester Inter Partes Reexamination, for Control No. 95/000,695, dated Feb. 5, 2019, 5 pages, USA.
United States Patent and Trademark Office, Status Inquiry, for U.S. Appl. No. 14/858,872, filed Feb. 14, 2019, 3 pages, USA.
Electronic Petition Request for Terminal Disclaimer, for U.S. Appl. No. 14/858,872, filed Apr. 30, 2019, 3 pages.
United States Patent and Trademark Office, Electronic Approval of Terminal Disclaimer for U.S. Appl. No. 14/858,872, filed Apr. 30, 2019, 1 page, USA.
United States Patent and Trademark Office, Final Office Action for U.S. Appl. No. 15/590,881, dated Apr. 4, 2019, 20 pages, USA.
Electronic Petition Request for Terminal Disclaimer, for U.S. Appl. No. 15/590,881, filed Apr. 30, 2019, 2 pages.
United States Patent and Trademark Office, Electronic Approval of Terminal Disclaimer for U.S. Appl. No. 15/590,881, filed Apr. 30, 2019, 1 page, USA.
U.S. Appl. No. 16/015,688, Amendment, dated Feb. 5, 2019, 37 pages.
Electronic Petition Request for Terminal Disclaimer, for U.S. Appl. No. 16/015,688, filed Apr. 30, 2019, 3 pages.
United States Patent and Trademark Office, Electronic Approval of Terminal Disclaimer for U.S. Appl. No. 16/015,688, filed Apr. 30, 2019, 1 page, USA.
United States Patent and Trademark Office, Applicant Initiated Interview Summary, for U.S. Appl. No. 16/015,688, dated Apr. 30, 2019, 3 pages, USA.
U.S. Appl. No. 16/015,716, Amendment, dated Feb. 19, 2019, 39 pages.
Electronic Petition Request for Terminal Disclaimer, for U.S. Appl. No. 16/015,716, filed Apr. 30, 2019, 3 pages.
United States Patent and Trademark Office, Electronic Approval of Terminal Disclaimer for U.S. Appl. No. 16/015,716, filed Apr. 30, 2019, 1 page, USA.
United States Patent and Trademark Office, Applicant Initiated Interview Summary, for U.S. Appl. No. 16/015,716, dated Apr. 30, 2019, 3 pages, USA.
United States Patent and Trademark Office, Final Office Action for U.S. Appl. No. 16/015,716, dated Nov. 7, 2019, (33 pages). U.S.
United States Patent and Trademark Office, NonFinal Office Action for U.S. Appl. No. 15/590,881, dated Nov. 29, 2019, (14 pages). U.S.
United States Patent and Trademark Office, NonFinal Office Action for U.S. Appl. No. 14/858,872, dated Nov. 29, 2019, (19 pages), U.S.
United States Patent and Trademark Office, NonFinal Office Action for U.S. Appl. No. 16/015,688, dated Jul. 12, 2019, (18 pages), USA.
United States Patent and Trademark Office, Notice of Panel Decision From Pre-Appeal Brief Review for U.S. Appl. No. 15/590,881, dated Sep. 3, 2019, (2 pages), USA.
United States Patent and Trademark Office, NonFinal Office Action for U.S. Appl. No. 16/015,688, dated Dec. 26, 2019, (21 pages), USA.
U.S. Appl. No. 14/666,105, filed Mar. 23, 2015, U.S. Pat. No. 10,023,740, Patented.
U.S. Appl. No. 12/406,454, filed Mar. 18, 2009, U.S. Pat. No. 8,986,586, Patented.

* cited by examiner

ELECTRICAL CABLE HAVING CROSSLINKED INSULATION WITH INTERNAL PULLING LUBRICANT

CROSS-REFERENCE TO RELATED APPLICATIONS

This patent application is a continuation of U.S. application Ser. No. 14/666,105, filed Mar. 23, 2015, which is a continuation of U.S. application Ser. No. 12/406,454, filed Mar. 18, 2009 and now issued as U.S. Pat. No. 8,986,586, all of which are incorporated herein by reference in their entirety.

FIELD OF THE INVENTION

The present invention relates to electrical power cables having crosslinked insulation, more particularly to methods for reducing the installation pulling force of electrical cables having crosslinked insulation, and even more particularly to preferred pulling lubricant compositions for effecting such reduction.

BACKGROUND OF THE INVENTION

Electrical power cables typically include a conductor core and an outer jacket or sheath. The "conductor core", as used herein and throughout the specification and claims, may be, for example, a single metal wire, multiple small wires twisted together to make a "stranded" cable, multiple insulated wires, or other types of electrical conductors acting together to serve a particular power function (e.g., three-phase connection). The term "sheath," as used herein and throughout the specification and claims, means the outermost covering surrounding the conductor core, whether of a single type material or multiple layers of the same or different material. The sheath may comprise one or more layers of polymeric or other material to provide physical, mechanical, electrical insulating and/or chemical protection for the underlying cable components. Crosslinked polymers such as crosslinked polyethylene (XLPE) are used as electrical insulation layers or jackets for various electrical power cable types such as type XHHW, type RHH/RHW, and type USE cables Installation of electrical power cable often requires that it be pulled through tight spaces or small openings in, and in engagement with, narrow conduits, raceways, cabletrays, or passageways in rafters or joists. This becomes problematic since the exterior surface of the cable sheath normally has a multitude of forces acting on it, therefore requiring a large pulling force. Moreover, installation parameters include maximum allowable cable pulling tension and/or sidewall pressure limits. Exceeding these limits can result in degradation of the cable, physical damage and inferior installation.

To overcome this problem, the general industry practice has been to coat the exterior surface of the cable sheath with a lubricant at the job site in order to reduce the coefficient of friction between this surface and the conduit walls or like surfaces, typically using vaselines or lubricants produced specifically for such purpose, such as Yellow 77® (hereinafter, "Y 77"). However, applying a lubricant like Y 77 to the finished cable at the job site poses problems, principally the additional time, expense and manpower required to lubricate the finished cable surface at the job site as well as to clean up after the lubricating process is completed.

Alternative solutions have been proposed, including the application of a separate lubricant layer after the polymeric sheath has been formed or extruded during the manufacturing of the cable, or the application of granules of material to the still-hot sheath during the extrusion process, which granules are designed to become detached when the cable is pulled through the duct. These solutions not only require major alterations of the manufacturing line, but result in a loss in manufacturing time, increased economic costs, and undesirable fluctuations in the geometrical dimensions of the cable sheaths. Other proposed solutions have involved spraying, dipping, or otherwise externally applying a "pulling" lubricant to the exterior surface of the sheath, but these techniques have not been satisfactory for all conditions of service.

As a result, a major breakthrough in this area has been the development of an innovative process by which a preselected pulling lubricant, of appropriate type and sufficiency, is internally introduced during the cable manufacture into the material that is to form the sheath, so that the pulling lubricant, either by migration through, or permeation throughout, the sheath becomes available at the exterior surface of the cable sheath at the time of the cable's installation, and is effective to reduce the amount of force required to install the cable. This process is described in U.S. Pat. No. 7,411,129, assigned to the assignee of the present invention, and is incorporated herein by reference in its entirety. The hereindescribed invention is a specific improvement to such process, as applied to crosslinked insulation of the sheath.

It is important to an understanding of the present invention to know the difference between what are referred to as "pulling lubricants" and what are "processing lubricants." A pulling lubricant is a lubricant that appears at the outside surface of the sheath of the cable and is effective to reduce the force necessary to install the cable through building conduits and the like. A processing lubricant is lubricating material that is used to facilitate the cable manufacturing process, such as improving the flow of polymer chains during any polymer compounding as well as during the extrusion processes while the polymer is in its molten or melt phase. Cable manufacturers have long used processing lubricants, such as stearic acid or ethylene bis-stearamide wax, as a minor component of the polymeric compound from which the cable sheath is formed. Because a processing lubricant is normally not effective except when the polymer is in this melt phase, the effect of a processing lubricant as an external lubricant is essentially non-existent in the final hardened polymer sheath of the cable. Even where there may be an excessive amount of the processing lubricant, a separate pulling lubricant would still be required to sufficiently reduce the cable sheaths' exterior surface coefficient of friction as well as minimize the pulling force necessary to install the cable.

Accordingly, there has been a long-felt need for an effective method of providing a pulling lubricant at the exterior surface of finished power cables having insulation formed of crosslinked polymeric material, in which the pulling lubricant is effective to reduce the required installation pulling force.

SUMMARY OF THE INVENTION

As a consequence, this invention is directed to the use of certain pulling lubricants in electrical cable sheaths containing crosslinked polymers such as polyethylene. One embodiment of the invention provides a crosslinkable silane-ethylene copolymer impregnated with an effective amount of pulling lubricant, wherein the pulling lubricant does not deleteriously interfere with the subsequent crosslinking of the base polymer, and in the finished electrical cable, the pulling lubricant is available at the surface of the outer sheath of the electrical cable to reduce the cable sheath's exterior surface coefficient of friction and reduce the pulling force necessary to install the cable at the time of the cable's installation. The pulling lubricant generally is a high viscosity silicone, preferably polydimethylsiloxane, or a fatty acid amide such as erucamide or oleamide, and is present in an amount in the range of from about 2 to about 15% by weight, based on the total weight of the outer sheath.

In another embodiment, a method of forming a crosslinked polyethylene sheath for an electrical cable is provided, such method including (1) blending a crosslinkable polyethylene resin or ethylene copolymer with a silicone or fatty acid amide to form a blend, (2) processing the blend into a shape of a sheath for an electrical cable and (3) crosslinking the blend to form the crosslinked polyethylene sheath. The silicone or fatty acid amide is present in an amount in the range of from about 2 to about 15 weight percent, based on the total weight of the crosslinked polyethylene sheath.

As described in more detail below, the methods of this invention include introducing a pulling lubricant, of optimum weight percentage or quantity, into the manufacturing process at a particular stage of manufacture, which results in the pulling lubricant being present in the outer sheath, so that it is available to reduce the cable sheaths' exterior surface coefficient of friction and to minimize the pulling force necessary to install the cable. In theory, this is as a consequence of the migration of the pulling lubricant to the sheath surface; or alternatively, due to the permeation of the pulling lubricant throughout the sheath, depending upon the particular compositions.

As described in detail below, a crosslinked polyethylene sheath of a finished power cable is produced by the described method.

BRIEF DESCRIPTION OF THE DRAWINGS

These and other details and aspects of the invention, as well as the advantages thereof, will be more readily understood and appreciated by those skilled in the art from the following detailed description, taken in conjunction with the accompanying drawings, in which.

DETAILED DESCRIPTION OF THE INVENTION

Composition

Figure 1:
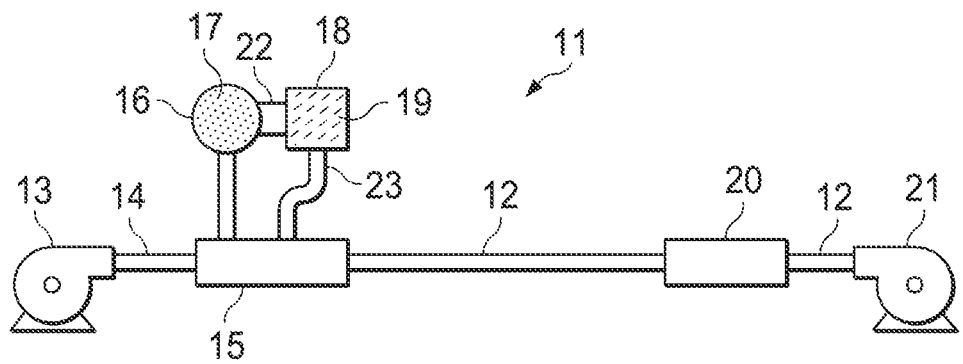
FIG. 1 is a diagrammatic representation of typical equipment used in the manufacture of cable in accordance with the present invention, when mixing the pulling lubricant with the crosslinkable polyethylene material prior to extrusion.

Polymeric materials used in compositions of the present invention include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like. Polyethylene resins useful in the present invention may include low density polyethylene, linear low density polyethylene, high density polyethylene, silane-grafted polyethylene, ethylene copolymers and combinations thereof. As previously described, for cables of the present invention, the conductor core of a single solid or stranded conductor is preferably surrounded by an insulating layer of low density crosslinked polyethylene (XLPE).

Crosslinked polyethylene (XLPE) may be produced by any method known in the art and preferably includes incorporating alkoxysilane functionality into the polymer structure either by grafting unsaturated alkoxysilanes onto the ethylene polymers or by direct copolymerization of ethylene with unsaturated alkoxysilanes. The silane-ethylene copolymer can be crosslinked, for example, by exposing the copolymer to moisture or steam in the presence of an organometallic catalyst, e.g., dibutyl-tin-dilaurate. Polyethylene resins useful in the present invention are capable of being crosslinked by a reactive unsaturated silane compound and exposure to water. Polyethylene crosslinking compounding materials are available from a number of manufacturers which supply silane pre-grafted base resins (the silane compound(s) being grafted onto the polyethylene resin by reactive extrusion) and catalyst masterbatches that can be mixed in proper proportions. For example, crosslinkable polyethylene system components are available from Padanaplast USA under the trade designation "Pexidan®" (including Pexidan® V/T, Pexidan® X/T, Pexidan® U/T, Pexidan® R/T, Pexidan® H/T and Pexidan® L/T) that include a silane pregraft (designated A-3001) and a catalyst masterbatch such as, for example, CAT-010FR, CAT-005FR, CAT-008, CAT-009, CAT-012FR, CAT-003, and CAT-047FRUV.

Alternatively, polyethylene crosslinkable compounds useful in the present invention (which may or may not be grafted or copolymerized with silane) are combined with a suitable crosslinking agent such as a heat-activated organic peroxide. The crosslinkable compounds may then be crosslinked by heat (and to a lesser extent, pressure) such as for example by steam curing. Other forms of curing also may be employed such as for example by using heated pressurized gasses such as nitrogen.

Generally, the crosslinkable polyethylene polymers are present in compositions of the present invention in an amount in the range of from about 20 to about 99 weight percent, based on the total weight of the composition, preferably in the range of from about 30 to about 85 weight percent based on the total weight of the composition, and more preferably in an amount in the range of from about 40 to about 80 weight percent, based on the total weight of the composition.

Compositions of the present invention further include a pulling lubricant in an amount sufficient to reduce the coefficient of friction of the exterior surface of the sheath/ cable and reduce the required cable pulling force during the cable's installation. Useful pulling lubricants include high viscosity silicones such as, for example, polydimethylsiloxane. The preferred pulling lubricant is polydimethylsiloxane or a fatty acid amide such as erucamide or oleamide in an amount in the range of from about 2 to about 15 weight percent based on the total weight of the composition.

When incorporated into a finished electrical cable sheath, the pulling lubricant is continuously available at the surface of the sheath/cable upon installation as a consequence of the migration of the pulling lubricant to the sheath surface during installation; or alternatively, due to the permeation of the pulling lubricant throughout the sheath. Under these circumstances, the pulling lubricant is effective to reduce the installation pulling force of the electrical cable.

Compositions of the present invention may further comprise additives known in the art, such as for example, flame retardants/catalysts and color concentrates.

Preparation of Compositions

Figure 8A:
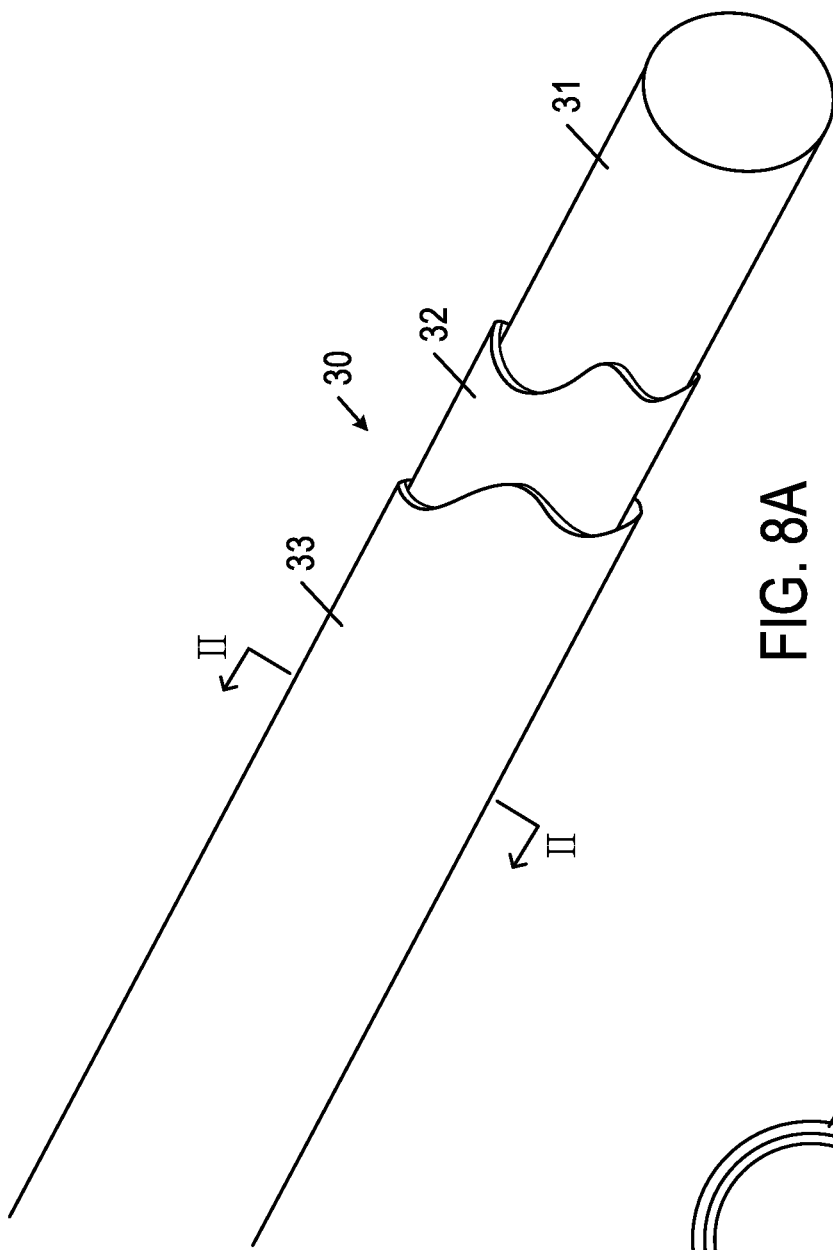
FIGS. 8A-8B are schematic illustrations of a cable comprising a plurality of sheath layers.
Figure 8B:
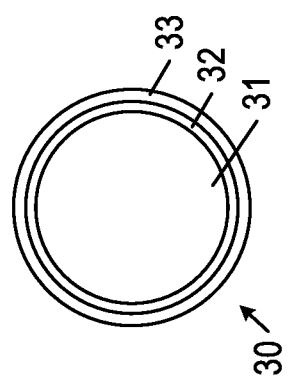

Referring initially to FIG. 1, there is depicted typical equipment 11 for manufacturing electrical cable 12 in accordance with one process of the present invention. The outer sheath of the cable is of an extruded crosslinked polymeric material such as polyethylene. The equipment 11 may include a reel 13 which supplies conductor wire 14 to an extruding head 15. In flow communication with the extrusion head is a tank 16 of crosslinkable polyethylene pellets 17. A tank 18 with the desired pulling lubricant 19 is adapted to be in flow communication with the tank 16 by way of conduit 22, thus enabling the mixing of the pulling lubricant with the pellets 17, the mixture thereafter introduced into the extruder. Alternatively, the tank may be adapted to be in fluid communication with the extruder or extrusion head 15, by way of conduit 23, downstream from the point of entry of the polyethylene material, thus allowing the pulling lubricant to mix with the polyethylene while in its molten state in the extruder or extruder head. A cooling box 20 for cooling the extruded product is provided, and a reel 21 is positioned for taking up the resulting cable assembly 12. When the final cable construction is such that there are multiple layers of sheath material (such as the electrical cable 30 comprising conductor wire 31, inner sheath layer 32 and outer sheath layer 33, as shown in FIGS. 8A-8B), the pulling lubricant should desirably be incorporated into the outermost layer (e.g., outer sheath layer 33, as shown in FIGS. 8A-8B).

As is therefore evident, the pulling lubricant can be mixed with the material from which the outer sheath is to be extruded prior to extrusion or, alternatively, introduced into the extruding head for subsequent mixing with the molten extrusion material as the sheath is being formed. As a further alternative, the pulling lubricant can be initially compounded with the polymeric material of the pellets themselves in a process upstream of that depicted in FIG. 1, thereby forming lubricated polymeric pellets, thus eliminating the need for tank 18 and conduits 22 and 23.

Preferably, the pulling lubricant is incorporated into a crosslinkable polyethylene copolymer by using a masterbatch system, thereby forming a carrier for the pulling lubricant. By using a masterbatch, high concentrations of the pulling lubricant are formulated with the crosslinkable polyethylene system in such quantities as to produce an appropriate concentration of the pulling lubricant in the final mixture. Where a masterbatch is used, the concentration of pulling lubricant generally is in the range of up to about 25%, but may be higher. Aliquot parts of the masterbatch mixture may then be added to the resin system and other components in various percentages permitting a relatively uniform dispersion of the pulling lubricant in the product at appropriate levels. For example, a 25% masterbatch of pulling lubricant added as 5% of the total mixture results in a final lubricant concentration of 1.25%, and a 25% masterbatch of pulling lubricant added as 10% of the total mixture results in a final lubricant concentration of 2.5%, etc. Generally, the amount of pulling lubricant contained in the final compound mixture is in the range of from about 2 to about 15% based on the total weight of the composition.

To adjust the levels of pulling lubricant in the final mixture, a second polymeric material may be included in the mixture formulation. The second polymeric material can be the same or different as the polymeric material used as the polymer carrying the pulling lubricant. Preferably, the second polymeric material comprises a crosslinkable silane-ethylene copolymer or pre-grafted polyethylene resin. Generally, the amount of second polymeric material is in the range of from about 18 to about 80 weight percent, based on the total weight of the composition. Flame retardants, catalysts, color concentrates and other additives may also be used. If such components are used, they may be kept separate from the polymer components until the time of extrusion.

Compositions of the present invention may be prepared by kneading and blending the various components in conventional kneaders, mixers, extruders, or other commonly used compounding machines, such as a single- or twin-screw compounding extruder, Buss kneader, Banbury mixer, two-roll mill, or other heated shear-type mixers. The melted, continuous homogeneous matrix of resin, pulling lubricant, and optional other components are then extruded to form jackets or sheaths for use in electrical cables. In either single-layer, co-extrusion or tandem extrusion methods, a conductor, either solid or stranded, is first introduced into an extrusion head where the heated, melted sheath composition is introduced and applied to the circumference of the conductor in one or more layers. The total thickness of the coating will vary mainly depending on the dimensions of the conductor and compliance with appropriate industry standards. The final product is then introduced into a cooling water bath and ultimately the cooled product is wound onto reels.

Preferably, the crosslinking of the polymers takes place subsequent to the extrusion step. The crosslinking process may take place in air or in a sauna, or alternatively in steam or in an inert atmosphere. When using a heat-cure method for crosslinking, the final product upon leaving the extruder head proceeds directly into a heated, pressurized chamber (or tube) where the crosslinking takes place. Generally, the chamber or tube is at a temperature considerably higher than the extruder or head themselves. Given the reactive nature of the polymeric components and crosslinking agents, it was surprising to find that the finished cables produced with compositions of the present invention yielded a pulling lubricant continuously available at the surface of the outer sheath so that it is available to reduce the cable sheaths' exterior surface coefficient of friction in order to minimize the pulling force necessary to install the cable. Given the reactive nature of the components, it was expected that the pulling lubricant would interfere with the crosslinking process or react and crosslink itself, making it less available at the surface of the cable sheath for lubrication.

In accordance with the testing subsequently described, it has been determined that, for type XHHW, type RHH/RHW, and type USE cables specifically, high viscosity silicones, specifically polydimethylsiloxane, or a fatty acid amide such as erucamide or oleamide are preferred pulling lubricants to be incorporated in the crosslinked polyethylene sheath.

EXAMPLES

The following examples are presented to further illustrate the present invention and are not to be construed as limiting the invention.

Example I

Various cable sheath compositions were formulated in accordance with the present invention for testing as described in more detail below. As shown in Table I, a polymeric resin of crosslinkable silane-ethylene copolymer (commercially available from Dow Chemical Company under the trade designation Si-Link™ AC DFDB-5451 NT) was initially blended with a 25% concentration of high viscosity silicone (polydimethylsiloxane) to yield a carrier-impregnated resin containing various percentages of pulling lubricant in the final mixture as indicated in Table I. With respect to all samples (except V-Y), the carrier-impregnated resin was coextruded with a pre-grafted polyethylene resin (commercially available from Padanaplast USA, Inc. under the trade designation A-3001) as well as a flame retardant/catalyst (commercially available from Padanaplast USA, Inc. as CATOO5FR, a mixture comprising polyethylene blended with a flame retardant and a catalyst), and a color concentrate (commercially available from Dow Chemical Company under the trade designation DFNC-0039 BK). The various sheathed samples were then cooled in a water bath prior to testing. A "control" cable was also prepared as indicated in Table I (which did not contain any pulling lubricant in the outer sheath).

TABLE I

| Sample | % Pulling Lubricant | Silane-ethylene copolymer impregnated with pulling lubricant | Standard pre-grafted polyethylene resin | Flame Retardant/ Catalyst | Color |
|---|---|---|---|---|---|
| A | 1 | 4 | 74.5 | 20 | 1.5 |
| B | 2 | 8 | 70.5 | 20 | 1.5 |
| C | 3 | 12 | 66.5 | 20 | 1.5 |
| D | 4 | 16 | 62.5 | 20 | 1.5 |
| E | 5 | 20 | 58.5 | 20 | 1.5 |
| F | 6 | 24 | 54.5 | 20 | 1.5 |
| G | 7 | 28 | 50.5 | 20 | 1.5 |
| H | 8 | 32 | 46.5 | 20 | 1.5 |
| I | 9 | 36 | 42.5 | 20 | 1.5 |
| J | 9.5 | 38 | 40.5 | 20 | 1.5 |
| K | 10 | 40 | 38.5 | 20 | 1.5 |
| L | 10.5 | 42 | 36.5 | 20 | 1.5 |
| M | 11 | 44 | 34.5 | 20 | 1.5 |
| N | 11.5 | 46 | 32.5 | 20 | 1.5 |
| O | 12 | 48 | 30.5 | 20 | 1.5 |
| P | 12.5 | 50 | 28.5 | 20 | 1.5 |
| Q | 13 | 52 | 26.5 | 20 | 1.5 |
| R | 13.5 | 54 | 24.5 | 20 | 1.5 |
| S | 14 | 56 | 22.5 | 20 | 1.5 |
| T | 14.5 | 58 | 20.5 | 20 | 1.5 |
| U | 15 | 60 | 18.5 | 20 | 1.5 |
| V+ | 1 | 4 | 74.5 | 20 | 1.5 |
| W+ | 2 | 8 | 70.5 | 20 | 1.5 |
| X+ | 3 | 12 | 66.5 | 20 | 1.5 |
| Y+ | 4 | 16 | 62.5 | 20 | 1.5 |
| Control | 0 | 0 | 78.5 | 20 | 1.5 |

* Amounts are weight percent, based on the total weight of the crosslinked polyethylene sheath.
+Ethylene copolymer only.

Example II

Coefficient of Friction Test

Figure 2:
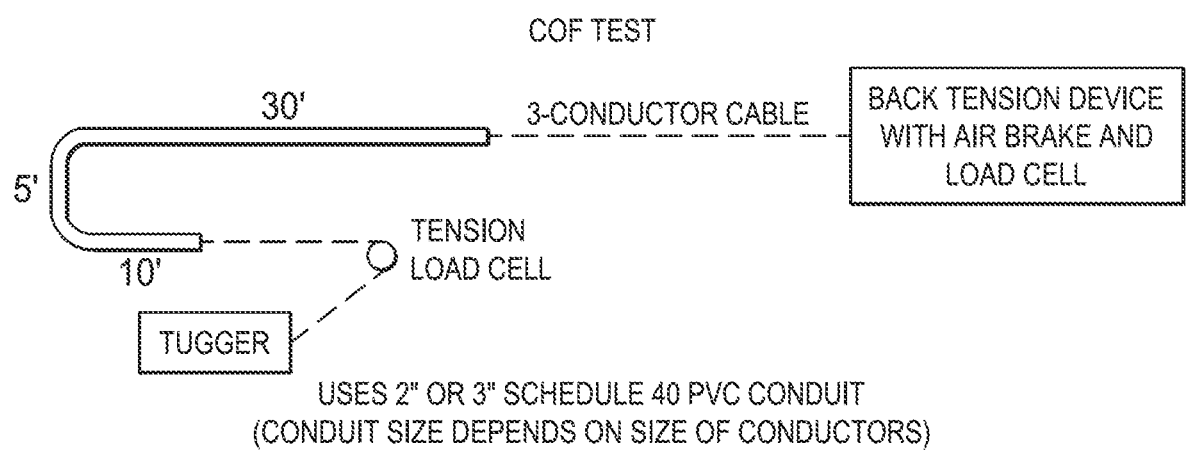
FIG. 2 is a representation of a test device which may be used in determining the coefficient of friction and related installation pulling forces of electrical cables of the present invention.

Referring now to FIG. 2, diagrammatically illustrated is the apparatus used to determine coefficient of friction for a given cable being pulled in conduit. The coefficient of friction test apparatus was developed to give a consistent way to determine the input values necessary to use the industry-standard program published by PolyWater Corporation to calculate a real-world coefficient of friction for a given cable being pulled in conduit. Given the inputs for the conduit setup, the back tension on the wire, and the pulling tension on the pulling rope, this program back-calculated a coefficient of friction for the cable by subtracting the back tension from the pulling tension and attributing the remaining tension on the rope to frictional forces between the cable and the conduit.

As shown in FIG. 2, the overall setup used a pulling rope threaded through—40' of PVC conduit (appropriately sized for the cable being pulled) with two 90° bends, the pulling rope threaded through a load cell so that pulling force could be constantly monitored and logged. Attached to the pulling rope was a 100' piece of XHHW cable to be tested comprising three AWG 4/0 wires. The end of the XHHW test sample was attached to a metal cable which was wrapped around a cylinder with an air brake to allow the constant back tension on the set up. The metal cable providing back-tension was also threaded through a load cell so that it could be monitored in real-time, and continuously logged. Values for both back tension and pulling tension were logged for the time it took to pull cable through the conduit run. The resulting values were then averaged and used in the PolyWater program to calculate coefficient of friction.

Figure 3:
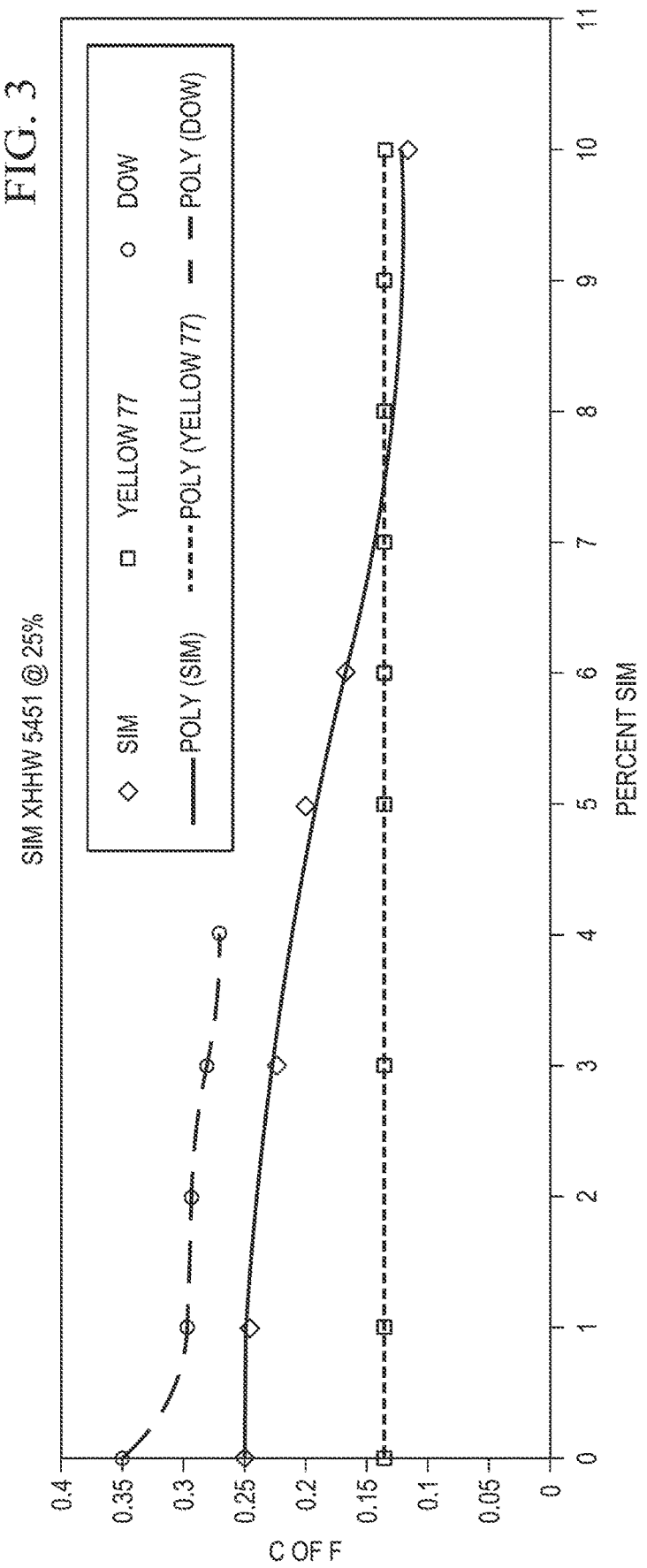
FIG. 3 is a graphical representation of test data obtained from the test device in FIG. 2 which compares the coefficient of friction of different XHHW cables incorporating varying amounts of pulling lubricant.
Figure 4:
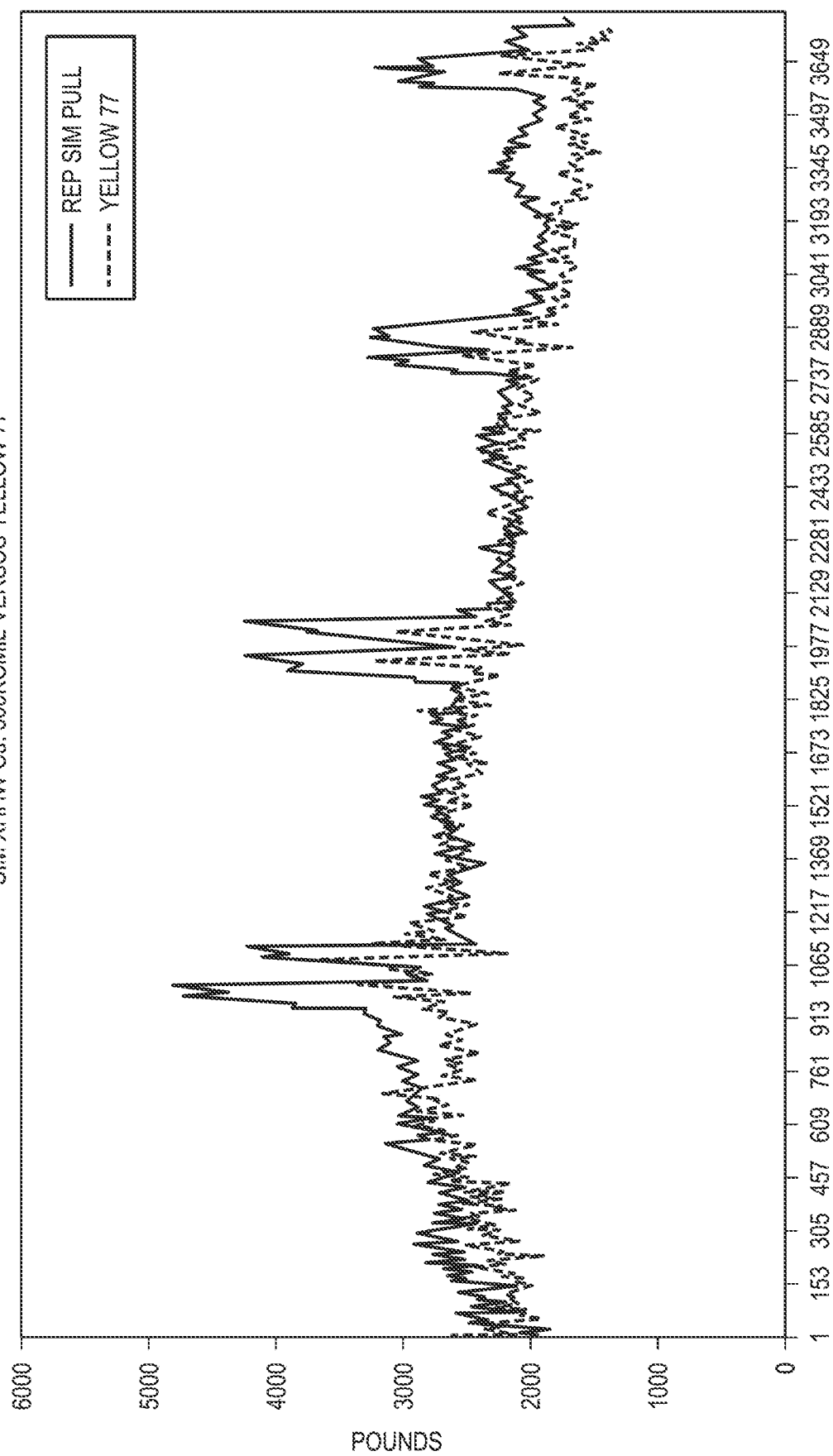
FIGS. 4-7 are graphical representations of test data obtained from a large scale test device and which compare the required pulling force of different XHHW cables incorporating varying amounts of pulling lubricant.
Figure 5:
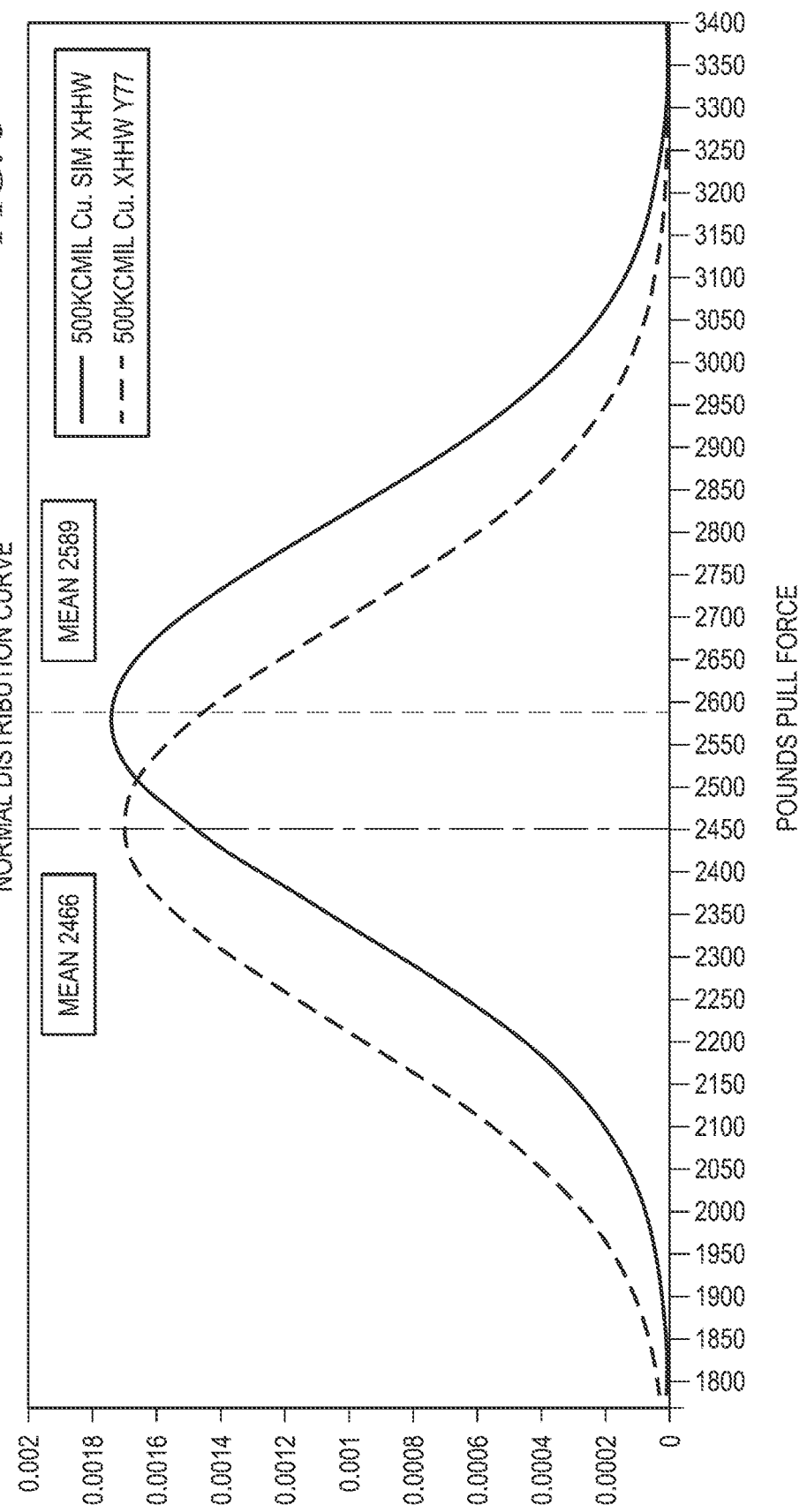
Figure 6:
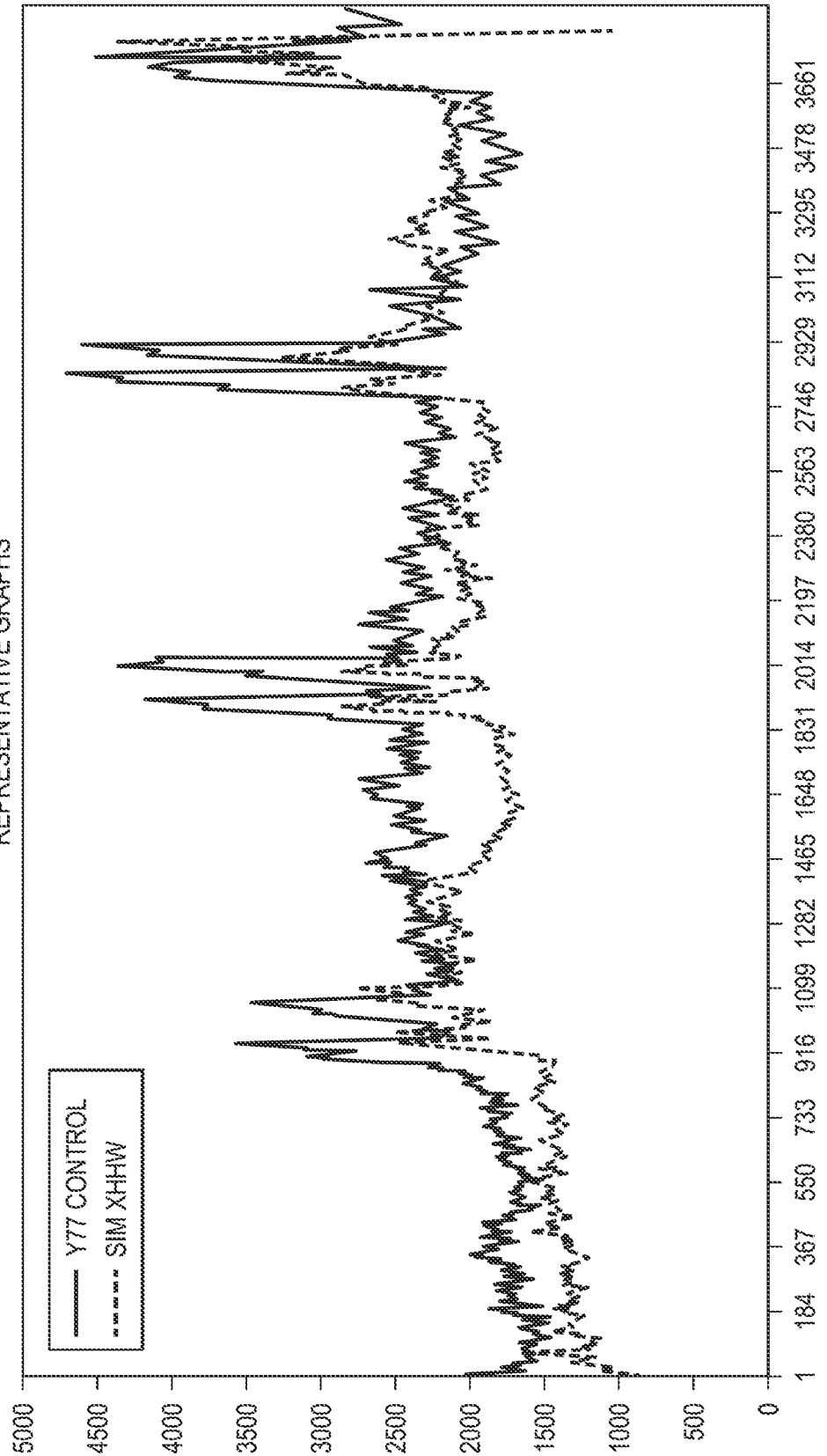
Figure 7:
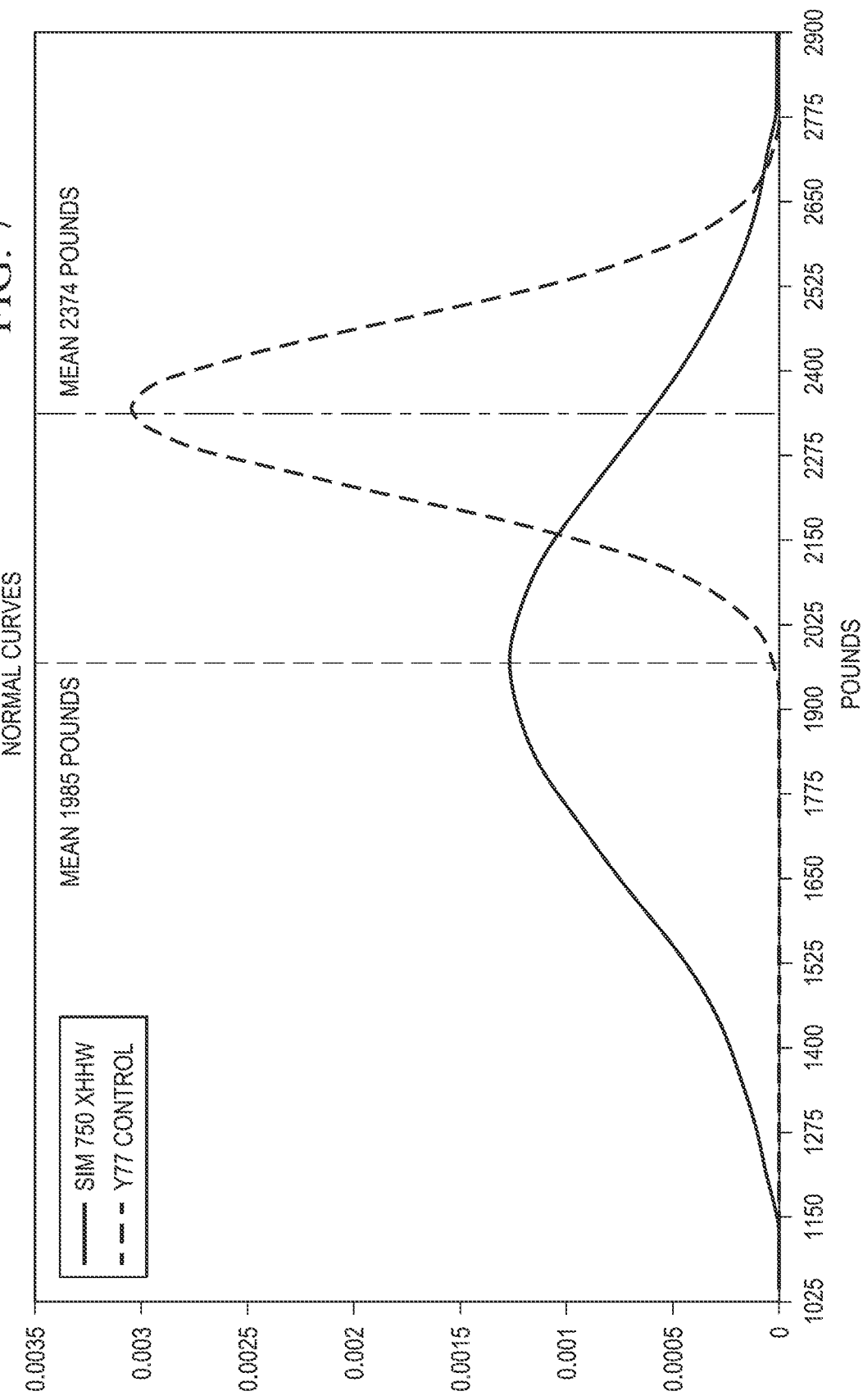

Referring now to FIG. 3, graphically illustrated is a comparison of the resulting coefficient of friction for various cable samples (made using the formulations described above in Example I) containing various percentages of pulling lubricant. As shown in FIG. 3, the line corresponding to "Poly (yellow 77)" represents the "Control" sample containing standard Padanaplast crosslinked polyethylene in the exterior sheath (with no internal pulling lubricant) which was coated with Yellow 77 pulling lubricant on the exterior of the sheath for the coefficient of friction test. The line corresponding to "Poly (Dow)" corresponds to Samples V-Y (in which the additional polymer was a silane-ethylene copolymer rather than a pre-grafted resin). The results in FIG. 3 illustrate that sheaths prepared in accordance with the invention containing pulling lubricant in an amount in the range of from about 2 to about 15 weight percent based on the total weight of the composition reduces the coefficient of friction of the exterior surface of the cable more significantly than cables prepared without pulling lubricant.

Large Scale Tests

Various test cable samples (750 kcmil Aluminum XHHW, 500 kcmil Copper XHHW, and AWG 4/0 Copper XHHW) were prepared using the formulations of Sample I and the "Control" sample of Example I. The samples were subjected to a "large scale" test to simulate "real world" installation conditions. In this test, multiple individual XHHW wires were provided on payoffs and attached to a pulling rope that was threaded through an arrangement of 3" conduit that included a total of about 450 feet of conduit interspersed with a total of eight 90° bends. A pulling rope was attached to the conductors and a tugger was used to pull the cable arrangement through the conduit. The rope was threaded through a pulley arrangement that used a load cell to monitor rope tension while the wire was pulled through the conduit. This tension was continuously logged and averaged to give an average pulling force for the pull. This force correlated directly to the coefficient of friction for the cable. 4 separate pulls were conducted for the Control samples and 5 separate pulls were conducted for cables formulated using the Sample I formulation. FIGS. 4-7 illustrate a comparison of the different required pulling forces for the Sample I and Control formulations tested in 500 kcmil copper (FIGS. 4 and 5) and 750 kcmil aluminum (FIGS. 6 and 7) products. As illustrated in these figures, the Sample I formulation with the aluminum conductor (FIGS. 6 and 7) resulted in a lesser average pulling force than the standard XHHW product with the externally applied industry standard Y77.

In accordance with an advantage of the present invention, the pulling lubricant that is incorporated in the sheath is present at the outer surface of the sheath when the cable engages, or in response to the cable's engagement with, the duct or other structure through which the cable is to be pulled. For the cables of the present invention, where the outer sheath is of crosslinked polyethylene and the preferred pulling lubricant is polydimethylsiloxane, the lubricant permeates the entire crosslinked polyethylene sheath portion and is, in effect, continuously squeezed to the sheath surface in what is referred to as the "sponge effect," when the cable is pulled through the duct. Where the preferred lubricant is a fatty acid amide such as erucamide or oleamide, the lubricant migrates to the surface of the sheath.

Although the aforementioned description references specific embodiments and processing techniques of the invention, it is to be understood that these are only illustrative. For example, although the description has been with respect to electrical cable, it is also applicable to other types of non-electrical cable such as, for example, fiber optic cable. Additional modifications may be made to the described embodiments and techniques without departing from the spirit and the scope of the invention as defined solely by the appended claims.

That which is claimed:

1. An electrical cable having a reduced installation pulling force through a building passageway, the electrical cable comprising:
    at least one conductor capable of carrying an electrical current through the electrical cable, wherein the conductor is formed at least in part from a metal; and
    a sheath for protecting the conductor, wherein the sheath comprises a solidified extrusion of a material mixture, the material mixture comprising:
        a first polymeric blend comprising a silane-ethylene copolymer resin and a pulling lubricant, wherein the silane-ethylene copolymer is provided as a carrier for the lubricant as a non-crosslinked resin, and wherein the pulling lubricant is a silicone material provided in an amount of at least 25 wt % of the total weight of the first polymeric blend;
        a second polymeric blend comprising polyethylene; and
        a flame retardant;
    wherein at least some of the silane-ethylene copolymer resin is crosslinked within the material mixture in the presence of a catalyst mixed with the flame retardant; and
    wherein the pulling lubricant is present in an amount greater than 2 wt % of the total weight of the material mixture and at least a portion of the pulling lubricant is present at an outer surface of the sheath to reduce the pulling force necessary to pull the electrical cable through the building passageway.

2. The electrical cable of claim 1, wherein the material mixture further comprises a silane pre-grafted polyethylene and wherein at least some of the silane pre-grafted polyethylene is crosslinked.

3. The electrical cable of claim 1, wherein the pulling lubricant is provided in an amount less than 15 wt % of the total weight of the material mixture.

4. The electrical cable of claim 1, wherein the pulling lubricant is polydimethylsiloxane.

5. The electrical cable of claim 4, wherein the pulling lubricant is provided in an amount of less than 15 wt % of the total weight of the material mixture.

6. The electrical cable of claim 1, wherein the material mixture is homogeneously blended.

7. The electrical cable of claim 1, wherein the first polymeric blend is provided in a range of about 20 wt % to about 99 wt % based on the total weight of the material mixture.

8. The electrical cable of claim 1, wherein the sheath comprises a plurality of sheath layers, and at least one of the sheath layers comprises the material mixture.

9. The electrical cable of claim 8, wherein the sheath comprises an inner sheath layer and an outer sheath layer, and wherein the outer sheath layer comprises the material mixture.

10. The electrical cable of claim 1, wherein the sheath provides the electrical cable with the physical characteristic of requiring at least 30% less force to pull the electrical cable through the building passageway compared to an amount of force required to pull a non-lubricated electrical cable of the same type and having an extruded sheath without the pulling lubricant mixed therein through the building passageway.

11. The electrical cable of claim 1, wherein the silane-ethylene copolymer resin is crosslinkable by exposure to moisture in the presence of a crosslinking catalyst.

12. The electrical cable of claim 1, wherein the extruded sheath has a round profile.

13. The electrical cable of claim 1, wherein the pulling lubricant is present in an amount greater than 3 wt % of the total weight of the material mixture.

14. The electrical cable of claim 13, wherein the pulling lubricant is present in an amount less than 15 wt % of the total weight of the material mixture.

* * * * *